United States Patent
Xin et al.

(10) Patent No.: US 11,877,227 B2
(45) Date of Patent: Jan. 16, 2024

(54) USER ACCESS CONTROL METHOD AND APPARATUS

(71) Applicant: Huawei Technologies Co., Ltd., Shenzhen (CN)

(72) Inventors: Yang Xin, Shanghai (CN); Xiaobo Wu, Shenzhen (CN); Weiwei Chong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 303 days.

(21) Appl. No.: 17/331,063

(22) Filed: May 26, 2021

(65) Prior Publication Data

US 2021/0282072 A1 Sep. 9, 2021

Related U.S. Application Data

(63) Continuation of application No. PCT/CN2019/105211, filed on Sep. 10, 2019.

(30) Foreign Application Priority Data

Nov. 27, 2018 (CN) .......................... 201811429525.1

(51) Int. Cl.
*H04W 48/02* (2009.01)
*H04W 28/18* (2009.01)

(52) U.S. Cl.
CPC ........... *H04W 48/02* (2013.01); *H04W 28/18* (2013.01)

(58) Field of Classification Search
CPC ..... H04W 48/02; H04W 28/18; H04W 24/02; H04W 16/18; H04W 28/16; H04W 28/24;
(Continued)

(56) References Cited

U.S. PATENT DOCUMENTS

2018/0270743 A1 9/2018 Callard et al.
2022/0022090 A1\* 1/2022 Schliwa-Bertling .... H04L 41/40

FOREIGN PATENT DOCUMENTS

CA 3057401 A1 9/2018
CN 107919969 A 4/2018
(Continued)

OTHER PUBLICATIONS

S2-1810599, China Mobile et al., "Solution for Key Issue 14: How to ensure that slice SLA is guaranteed", SA WG2 Meeting #129, Oct. 15-19, 2018, China (Year: 2018).*

(Continued)

*Primary Examiner* — Natasha W Cosme
*Assistant Examiner* — Yewon Kim
(74) *Attorney, Agent, or Firm* — Leydig, Voit & Mayer, Ltd.

(57) ABSTRACT

Embodiments of this application provide a user access control method. The method performed by a first network element includes: sending a first request including at least one of first indication information and second indication information to a second network element, where the first indication information indicates to report first information of at least one network slice to the first network element, and the second indication information indicates that the first network slice is a newly established network slice, a network slice on which a drive test is being performed, or a network slice for which no service level agreement is signed; receiving the first information of the at least one network slice from the second network element; and controlling user access to the first network slice based on a relationship between quality and a quality requirement of the at least one network slice.

18 Claims, 13 Drawing Sheets

(58) Field of Classification Search
CPC ..... H04W 48/06; H04W 48/18; H04W 28/20; H04L 41/40; H04L 41/5025; H04L 41/5051
See application file for complete search history.

(56) References Cited

FOREIGN PATENT DOCUMENTS

| CN | 108024270 A | 5/2018 |
|---|---|---|
| CN | 108282352 A | 7/2018 |
| CN | 108811168 A | 11/2018 |
| CN | 108684073 B | 8/2019 |
| JP | 2018513659 A | 5/2018 |
| WO | 2018149269 A1 | 8/2018 |
| WO | 2020093780 A1 | 5/2020 |

OTHER PUBLICATIONS

S2-188031, China Mobile et al., "Solution to Key Issue 4 to assist slice resource allocation and adjustment", SA WG2 Meeting #128bis, Aug. 20-24, 2018, France (Year: 2018).*

Ericsson, "Solution to Key Issue 14," SA WG2 Meeting #S2-129-Bis, West Palm Beach, Florida, USA, S2-1811732, total 9 pages, 3rd Generation Partnership Project, Valbonne, France (Nov. 26-30, 2018).

"3rd Generation Partnership Project; Technical Specification Group Services and System Aspects; System Architecture for the 5G System; Stage 2 (Release 15)," 3GPP TS 23.501 V15.3.0, total 226 pages, 3rd Generation Partnership Project, Valbonne, France (Sep. 2018).

China Mobile et al., "Solution for Key Issue 14: How to ensure that slice SLA is guaranteed," SA WG2 Meeting #S2-129bis, West Palm Beach, Florida, USA, S2-1812127, total 5 pages, 3rd Generation Partnership Project, Valbonne, France (Oct. 26-30, 2018).

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)," 3GPP TS 37.320 V15.0.0, total 27 pages, 3rd Generation Partnership Project, Valbonne, France (Jun. 2018).

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH)(Release 16)," 3GPP TS 26.247 V16.0.0, total 137 pages, 3rd Generation Partnership Project, Valbonne, France (Sep. 2018).

"3rd Generation Partnership Project; Technical Specification Group Services and System Aspects; Study of Enablers for Network Automation for 5G (Release 16)," 3GPP TR 23.791 V1.1.0, total 97 pages, 3rd Generation Partnership Project, Valbonne, France (Oct. 2018).

China Mobile, Huawei, "Slice SLA Guarantee from Control plane," SA WG5 Meeting #129, Dongguan, China, S2-1810600, total 33 pages (Oct. 15-19, 2018).

China Mobile, Alibaba, CATR, China Unicom, Huawei, Tencent, KDDI, China Telecom, "Solution for Key Issue 14: How to ensure that slice SLA is guaranteed," SA WG2 Meeting #S2-129bis, West Palm Beach, Florida, USA, S2-1812757, total 4 pages (Oct. 26-30, 2018).

* cited by examiner

USER ACCESS CONTROL METHOD AND APPARATUS

CROSS-REFERENCE TO RELATED APPLICATIONS

This application is a continuation of International Application No. PCT/CN2019/105211, filed on Sep. 10, 2019, which claims priority to Chinese Patent Application No. 201811429525.1, filed on Nov. 27, 2018. The disclosure of the aforementioned applications are hereby incorporated by reference in their entireties.

TECHNICAL FIELD

Embodiments of this application relate to the field of communications technologies, and in particular, to a user access control method and an apparatus.

BACKGROUND

To cope with a difference between requirements of different communications services on network performance, a concept of a network slice (NS) is introduced into a 5th generation (5G) mobile communications technology network. In other words, the 5G network is divided based on actual network resources and functions to form different network slices to meet the different requirements. This can reduce network operation investment costs and enrich network operation modes.

Running quality of a plurality of network slices in a network affects each other. In a network establishment process, a newly established network slice inevitably needs to be introduced. In this case, running of the newly established network slice may affect running quality of an existing network slice. An operator mainly focuses on how to reduce impact of the newly established network slice on the running quality of the existing network slice in the network, and on whether a remaining network resource can meet a requirement of the newly established network slice.

Currently, in a conventional technology, an operation, administration, and maintenance (OAM) network element first needs to obtain a correspondence between QoE and a KPI of a network slice. Then, the OAM network element deduces a maximum quantity of users in the KPI of the network slice based on the QoE in a running process of the network slice. Finally, the OAM network element feeds back the maximum quantity of users to a network slice selection function (NSSF) network element. The NSSF network element controls user access to the newly established network slice based on the maximum quantity of users.

However, at an early stage of a new deployment of the network slice, it takes a relatively long time for the OAM network element to collect KPI data, and it also takes time to analyze a relationship between QoE and a KPI. Therefore, an operation periodicity of adjusting user access to the newly established network slice by using an existing solution is very long. If the user access to the newly established network slice affects a service level agreement (SLA) that is for an existing network slice, the user access to the newly established network slice cannot be adjusted in time by using the existing solution.

Therefore, avoiding impact of a newly established network slice on quality of an existing network slice is a problem that urgently needs to be resolved.

SUMMARY

Embodiments of this application provide a user access control method, an information sending method, and an apparatus, to control in time a quantity of users accessing a newly established network slice.

According to a first aspect, an embodiment of this application provides a user access control method, including: a first network element sends a first request including at least one of first indication information and second indication information to a second network element. The first indication information is used to indicate to report first information of at least one network slice to the first network element. The second indication information is used to indicate that a first network slice is a newly established network slice, a network slice on which a drive test is being performed, or a network slice for which no SLA is signed. The first network element receives a first response including the first information of the at least one network slice from the second network element. The first information of the at least one network slice is used to determine a relationship between quality and a quality requirement of the at least one network slice. The first network element controls user access to the first network slice based on the relationship between the quality and the quality requirement of the at least one network slice.

According to the user access control method provided in this embodiment of this application, to resolve a problem that a user access status or a service status of any one of a plurality of network slices in a same network area affects running quality of another network slice, the first network element sends the first request to the second network element, to indicate to the second network element that there is a newly established network slice, a network slice on which a drive test is being performed, or a network slice for which no SLA is signed (for example, the first network slice) in a network area. In this way, the second network element reports the first information of the at least one network slice in time, so that the first network element can quickly obtain the relationship between the quality and the quality requirement of the at least one network slice. Then, the first network element may quickly control user access to the first network slice based on the relationship between the quality and the quality requirement of the at least one network slice, to avoid impact on another network slice. In addition, to ensure running quality of the another network slice in the network area, a status of the at least one network slice in a network may be learned of in time based on the relationship between the quality and the quality requirement of the at least one network slice. In this way, user access to the first network slice can be gradually controlled.

Optionally, the first network slice and the at least one network slice are network slices in a same network area.

In a possible implementation, the at least one network slice includes the first network slice. In this way, the first network element determines a relationship between quality and a quality requirement of the first network slice based on first information of the first network slice.

In a possible implementation, the at least one network slice does not include the first network slice. In this way, the first network element determines a relationship between quality and a quality requirement of the first network slice based on the first information of the at least one network slice.

In a possible implementation, that the first network element controls user access to the first network slice based on the relationship between the quality and the quality requirement of the at least one network slice includes: the first network element determines that quality of the first network slice is higher than a quality requirement of the first network slice, and the first network element increases a quantity of users accessing the first network slice. Alternatively, the first network element determines that quality of the first network slice is lower than a quality requirement of the first network slice, and the first network element reduces a quantity of users accessing the first network slice. Alternatively, the first network element determines that quality of the first network slice is equal to a quality requirement of the first network slice, and the first network element maintains a quantity of users accessing the first network slice.

In a possible implementation, the method provided in this embodiment of this application further includes: the first network element controls user access to another network slice different from the first network slice in the at least one network slice based on the relationship between the quality and the quality requirement of the at least one network slice. This is because if the first network slice is added, running quality of the another network slice may be affected. Therefore, user access to the another network slice is controlled, so that the another network slice can meet an SLA.

In a possible implementation, the method provided in this embodiment of this application further includes: the first network element determines that the first network slice is a newly established network slice, a network slice on which a drive test is being performed, or a network slice for which no SLA is signed. In this way, the first network element can request the first information of the at least one network slice from the second network element in time.

In a possible implementation, that the first network element determines that the first network slice is a newly established network slice, a network slice on which a drive test is being performed, or a network slice for which no SLA is signed includes: the first network element receives a notification message including third indication information from a third network element. The third indication information is used to indicate that the first network slice is a newly established network slice, a network slice on which a drive test is being performed, or a network slice for which no SLA is signed. The first network element determines, based on the third indication information, that the first network slice is a newly established network slice, a network slice on which a drive test is being performed, or a network slice for which no SLA is signed.

In a possible implementation, the method provided in this embodiment of this application further includes: the first network element sends a second request including fourth indication information to the at least one network element corresponding to the at least one network slice. The fourth indication information is used to indicate to report first data that is in the at least one network element and that is corresponding to the at least one network slice to the second network element.

In a possible implementation, the second request may further include at least one of the following information corresponding to the at least one network slice: identification information, a network area, and time information of the network slice.

In a possible implementation, the method provided in this embodiment of this application further includes: the first network element determines the fourth indication information based on that the first network slice is a newly established network slice, a network slice on which a drive test is being performed, or a network slice for which no SLA is signed.

In a possible implementation, the method provided in this embodiment of this application further includes: the first network element sends a third request used to request address information of the at least one network element to the fourth network element. The third request includes at least one of the following information corresponding to the at least one network slice: identification information, a network area, and time information of the network slice. The first network element receives the address information of the at least one network element from the fourth network element.

For example, the address information of the at least one network element may be at least one of the following information of the at least one network element: an identifier, an IP address, a fully qualified domain name FQDN, and an endpoint address.

In a possible implementation, the first data is flow-level network data or flow-level service data. It should be understood that a flow may be a service flow or a quality of service (QoS) flow of a service corresponding to the at least one network slice. It should be understood that the service flow or the QoS flow is a service flow or a QoS flow established when a terminal transmits service data in a network.

In a possible implementation, the at least one network element includes a fifth network element. When the fifth network element is an application function AF network element, first data that is in the fifth network element and that is corresponding to the at least one network slice includes: one or more of a service identifier of a service to which a flow belongs, a communication pattern parameter of the service to which the flow belongs, flow bit rate data of a first interface, delay data of the first interface, packet loss rate data of the first interface, packet data of the first interface, a timestamp, service experience data of the service to which the flow belongs, jitter buffer data, transmission control protocol TCP congestion window data, TCP receive window data, media coding type data, coding rate data of the media coding type data, and buffer data. The first interface is an interface between a user plane function UPF network element and a data network DN corresponding to the AF network element.

Alternatively, when the fifth network element is a policy control function PCF network element, first data that is in the fifth network element and that is corresponding to the at least one network slice includes: one or more of a service identifier of a service to which a flow belongs, an identifier of a session in which the flow is located, a data network name DNN of the session in which the flow is located, identification information of a network slice in which the flow is located, IP filter information, a media bandwidth requirement, traffic routing information, a jitter buffer requirement, a TCP congestion window requirement, a TCP receive window requirement, a media coding type requirement, a coding rate requirement in the media coding type requirement, a validity time window of the service identifier, and a radio access technology type.

Alternatively, when the fifth network element is a session management function SMF network element, first data that is in the fifth network element and that is corresponding to the at least one network slice includes one or more of the following information: an identifier of a flow, an identifier of a session in which the flow is located, a DNN of the session in which the flow is located, identification information of a network slice in which the flow is located, a validity time window of the identifier of the flow, and a radio access technology type.

Alternatively, when the fifth network element is a first UPF network element, first data that is in the fifth network element and that is corresponding to the at least one network slice includes: an identifier of a flow, a timestamp, flow bit rate data of a second interface, flow bit rate data of a first interface, bit rate data of a third interface, delay data of the second interface, delay data of the first interface, delay data of the third interface, packet loss rate data of the first interface, packet loss rate data of the second interface, packet loss rate data of the third interface, packet data of the first interface, packet data of the second interface, and packet data of the third interface, where the second interface is an interface between the first UPF network element and an access device, and the third interface is an interface between the first UPF network element and a second UPF network element.

Alternatively, when the fifth network element is an access and mobility management function AMF network element, first data that is in the fifth network element and that is corresponding to the at least one network slice includes: one or more of location information of a terminal corresponding to a flow, an identifier of a session in which the flow is located, a DNN of the session in which the flow is located, identification information of a network slice in which the flow is located, a validity time window of the identifier of the session in which the flow is located, and a radio access technology type.

Alternatively, when the fifth network element is an access device, first data that is in the fifth network element and that is corresponding to the at least one network slice includes: one or more of location information of a terminal corresponding to a flow, an identifier of the flow, an identifier of a session in which the flow is located, identification information of a network slice in which the flow is located, a timestamp, flow bit rate data of a fourth interface, flow bit rate data of a second interface, delay data of the second interface, delay data of the fourth interface, reference signal received power RSRP data, reference signal received quality RSRQ data, signal to interference plus noise ratio SINR data, channel quality information CQI data, block error rate BLER data, a congestion level, packet loss rate data of the second interface, packet loss rate data of the fourth interface, packet data of the second interface, packet data of the fourth interface, a radio access technology type, and dual-connectivity indication information. The fourth interface is an interface between the access device and the terminal.

Alternatively, when the fifth network element is a terminal, first data that is in the fifth network element and that is corresponding to the at least one network slice includes: one or more of location information of a terminal corresponding to a flow, an identifier of the flow, an identifier of a session in which the flow is located, a DNN of the session in which the flow is located, identification information of a network slice in which the flow is located, flow bit rate data of a fourth interface, delay data of the fourth interface, packet loss rate data of the fourth interface, packet data of the fourth interface, a timestamp, processor CPU usage data, memory usage data, service experience data, jitter buffer data, TCP congestion window data, TCP receive window data, media coding type data, coding rate data of the media coding type data, RSRP data, RSRQ data, SINR data, CQI data, BLER data, and buffer data.

Alternatively, when the fifth network element is a network management network element, first data that is in the fifth network element and that is corresponding to the at least one network slice includes: one or more of performance measurement data of an access device, performance test data of a core network, and end-to-end key performance indicator KPI data.

In a possible implementation, the first request may further include at least one of the following information of the at least one network slice: identification information, time information, and area information of the network slice. In this way, the second network element can determine a range for obtaining the first information of the at least one network slice.

In a possible implementation, first information of any one of the at least one network slice includes at least one of the following information of the any one network slice: identification information, time information, area information, a first maximum quantity of users, and service information, where the service information is used to determine a service status. In this way, the first network element can determine a running status of the at least one network slice in the network.

In a possible implementation, the service information includes at least one of the following information corresponding to a service: a service identifier, a first maximum quantity of users, first average service experience, first service experience range information, and first service satisfaction.

In a possible implementation, the first network element is any one of a network slice selection function NSSF network element, a network slice management function NSMF network element, or a network slice subnet management function NSSMF network element. The second network element is a network data analytics function NWDAF network element or a management data analytics function MDAF network element.

According to a second aspect, an embodiment of this application provides an information sending method, including: a second network element receives a first request including first indication information from a first network element. Alternatively, a second network element receives a first request including first indication information and second indication information from a first network element. Alternatively, a second network element receives a first request including second indication information from a first network element. The first indication information is used to indicate to report first information of at least one network slice to the first network element, and the second indication information is used to indicate that a first network slice is a newly established network slice, a network slice on which a drive test is being performed, or a network slice for which no SLA is signed. The second network element determines the first information of the at least one network slice. The second network element sends a first response including the first information of the at least one network slice to the first network element. It should be understood that the first information of the at least one network slice is used to help the first network element determine a relationship between quality and a quality requirement of the at least one network slice.

In a possible implementation, the at least one network slice includes the first network slice.

In a possible implementation, the at least one network slice does not include the first network slice.

In a possible implementation, that the second network element determines the first information of the at least one network slice includes: the second network element obtains first data that is in at least one network element and that is corresponding to the at least one network slice. The second network element determines the first information of the at least one network slice based on the first data that is in the at least one network element and that is corresponding to the at least one network slice.

In a possible implementation, that the second network element obtains first data that is in at least one network element and that is corresponding to the at least one network slice includes: the second network element receives the first data that is in the at least one network element and that is corresponding to the at least one network slice from the at least one network element.

In a possible implementation, the method provided in this embodiment of this application further includes: the second network element sends a fourth request to the at least one network element corresponding to the at least one network slice, where the fourth request includes fifth indication information. The fifth indication information is used to indicate the at least one network element to report the first data that is in the at least one network element and that is corresponding to the at least one network slice to the second network element.

In a possible implementation, the at least one network element includes a fifth network element. Specifically, when the fifth network element may be any one of an application function AF network element, a PCF network element, a terminal, an SMF network element, an access device, and a first UPF network element, for specific content of the first data, refer to related descriptions in the first aspect. Details are not described herein again.

In a possible implementation, the first request may further include at least one of the following information of the at least one network slice: identification information, time information, and area information of the network slice.

In a possible implementation, the first information includes at least of the following information of the at least one network slice: identification information, time information, area information, a first maximum quantity of users, and service information, where the service information is used to determine a service status.

In a possible implementation, the service information includes at least one of the following information corresponding to a service: a service identifier, a first maximum quantity of users, first average service experience, first service experience range information, and first service satisfaction.

According to a third aspect, an embodiment of this application provides a user access control apparatus. The user access control apparatus may implement the user access control method described in any one of the first aspect or the possible implementations of the first aspect, and therefore may also implement the beneficial effects in any one of the first aspect or the possible implementations of the first aspect. The user access control apparatus may be a first network element, or may be an apparatus that can support a first network element in implementing any one of the first aspect or the possible implementations of the first aspect. For example, the user access control apparatus is a chip used in the first network element. The user access control apparatus may implement the foregoing method by using software or hardware, or by using hardware executing corresponding software.

In an example, the user access control apparatus includes a sending unit, configured to send a first request to a second network element, where the first request includes at least one of first indication information and second indication information, where the first indication information is used to indicate to report first information of at least one network slice to the first network element, and the second indication information is used to indicate that a first network slice is a newly established network slice, a network slice on which a drive test is being performed, or a network slice for which no SLA is signed; a receiving unit, configured to receive a first response from the second network element, where the first response includes the first information of the at least one network slice; and a processing unit, configured to control user access to the first network slice based on the relationship between the quality and the quality requirement of the at least one network slice.

It should be understood that the first information of the at least one network slice is used to determine a relationship between quality and a quality requirement of the at least one network slice.

Optionally, the first network slice and the at least one network slice are network slices in a same network area.

In a possible implementation, the at least one network slice includes the first network slice.

In a possible implementation, the at least one network slice does not include the first network slice.

In a possible implementation, the processing unit is specifically configured to determine that quality of the first network slice is higher than a quality requirement of the first network slice, and increase a quantity of users accessing the first network slice. Alternatively, the processing unit is specifically configured to determine that quality of the first network slice is lower than a quality requirement of the first network slice, and reduce a quantity of users accessing the first network slice. Alternatively, the processing unit is specifically configured to determine that quality of the first network slice is equal to a quality requirement of the first network slice, and maintain a quantity of users accessing the first network slice.

In a possible implementation, the processing unit is further configured to control user access to another network slice different from the first network slice in the at least one network slice based on the relationship between the quality and the quality requirement of the at least one network slice.

In a possible implementation, the processing unit is further configured to determine that the first network slice is a newly established network slice, a network slice on which a drive test is being performed, or a network slice for which no SLA is signed.

In a possible implementation, the receiving unit is further specifically configured to receive a notification message including third indication information from a third network element. The third indication information is used to indicate that the first network slice is a newly established network slice, a network slice on which a drive test is being performed, or a network slice for which no SLA is signed. The processing unit is further specifically configured to determine, based on the third indication information, that the first network slice is a newly established network slice, a network slice on which a drive test is being performed, or a network slice for which no SLA is signed.

In a possible implementation, the sending unit is further configured to send a second request including fourth indication information to at least one network element corresponding to the at least one network slice. The fourth indication information is used to indicate to report first data that is in the at least one network element and that is corresponding to the at least one network slice to the second network element.

In a possible implementation, the processing unit is further configured to determine the fourth indication information based on that the first network slice is a newly established network slice, a network slice on which a drive test is being performed, or a network slice for which no SLA is signed.

In a possible implementation, the sending unit is further configured to send a third request used to request address information of the at least one network element to the fourth network element. The third request includes at least one of the following information corresponding to the at least one network slice: identification information, a network area, and time information. The first network element receives the address information of the at least one network element from the fourth network element.

For example, the address information of the at least one network element may be at least one of the following information of the at least one network element: an identifier, an IP address, a fully qualified domain name FQDN, and an endpoint address.

In a possible implementation, the first data is flow-level network data or flow-level service data.

In a possible implementation, the at least one network element includes a fifth network element. Specifically, when the fifth network element may be any one of an application function AF network element, a PCF network element a terminal, an SMF network element, an access device, and a first UPF network element, for specific content of the first data, refer to related descriptions in the first aspect. Details are not described herein again.

In a possible implementation, the first request may further include at least one of the following information of the at least one network slice: identification information, time information, and area information. In this way, the second network element can determine a range for obtaining the first information of the at least one network slice.

In a possible implementation, first information of any one of the at least one network slice includes at least one of the following information of the any one network slice: identification information, time information, area information, a first maximum quantity of users, and service information, where the service information is used to determine a service status. In this way, the first network element can determine a running status of the at least one network slice in the network.

In a possible implementation, the service information includes at least one of the following information corresponding to a service: a service identifier, a first maximum quantity of users, first average service experience, first service experience range information, and first service satisfaction.

In a possible implementation, the first network element is any one of a network slice selection function NSSF network element, a network slice management function NSMF network element, or a network slice subnet management function NSSMF network element. The second network element is a network data analytics function NWDAF network element or a management data analytics function MDAF network element.

In another example, this embodiment of this application further provides a user access control apparatus. The user access control apparatus may be a first network element or a chip used in a first network element. The user access control apparatus includes a communications interface and one or more processors.

The user access control apparatus communicates with another device through the communications interface. When the one or more processors execute instructions, the user access control apparatus performs the user access control method described in any one of the first aspect or the possible implementations of the first aspect.

For example, the communications interface is configured to support the user access control apparatus in performing message/data receiving and sending steps that are performed on the user access control apparatus side and that are described in any one of the first aspect or the possible implementations of the first aspect. The processor is configured to support the user access control apparatus in performing a message/data processing step that is performed on the user access control apparatus side and that is described in any one of the first aspect or the possible implementations of the first aspect. For specific corresponding steps, refer to the descriptions in any one of the first aspect or the possible implementations of the first aspect. Details are not described herein again.

Optionally, the communications interface and the processor of the user access control apparatus are coupled to each other.

Optionally, the user access control apparatus may further include a memory, configured to store computer program code, where the computer program code includes instructions. Optionally, the processor, the communications interface, and the memory are coupled to each other.

For example, the communications interface in the another example of the third aspect may perform the steps performed by the sending unit and the receiving unit in the example of the third aspect, and the processor may perform the steps performed by the processing unit in the example of the third aspect.

According to a fourth aspect, an embodiment of this application provides an information sending apparatus. The information sending apparatus may implement the information sending method described in any one of the second aspect or the possible implementations of the second aspect, and therefore may also implement the beneficial effects in any one of the second aspect or the possible implementations of the second aspect. The information sending apparatus may be a second network element, or may be an apparatus that can support a second network element in implementing any one of the second aspect or the possible implementations of the second aspect. For example, the information sending apparatus is a chip used in the second network element. The information sending apparatus may implement the foregoing method by using software, hardware, or hardware executing corresponding software.

In an example, the information sending apparatus includes: a receiving unit, configured to receive a first request including first indication information from a first network element, or a receiving unit, configured to receive a first request including first indication information and second indication information from a first network element, or a receiving unit, configured to receive a first request including second indication information from a first network element, where the first indication information is used to indicate to report first information of at least one network slice to the first network element, and the second indication information is used to indicate that a first network slice is a newly established network slice, a network slice on which a drive test is being performed, or a network slice for which no SLA is signed; a processing unit, configured to determine the first information of the at least one network slice, where the first information of the at least one network slice is used to determine a relationship between quality and a quality requirement of the at least one network slice; and a sending unit, configured to send a first response including the first information of the at least one network slice to the first network element.

In a possible implementation, the at least one network slice includes the first network slice.

In a possible implementation, the at least one network slice does not include the first network slice.

In a possible implementation, the processing unit is further configured to obtain first data that is in at least one network element and that is corresponding to the at least one network slice. The processing unit is specifically configured to determine the first information of the at least one network slice based on the first data that is in the at least one network element and that is corresponding to the at least one network slice.

In a possible implementation, the processing unit is further specifically configured to receive the first data that is in the at least one network element and that is corresponding to the at least one network slice from the at least one network element through the receiving unit.

In a possible implementation, the sending unit is further configured to send a fourth request including fifth indication information to the at least one network element corresponding to the at least one network slice. The fifth indication information is used to indicate the at least one network element to report the first data that is in the at least one network element and that is corresponding to the at least one network slice to the second network element.

In a possible implementation, the at least one network element includes a fifth network element. Specifically, when the fifth network element may be an application function AF network element, a PCF network element a terminal, an SMF network element, an access device, and a first UPF network element, for specific content of the first data, refer to related descriptions in the first aspect. Details are not described herein again.

In a possible implementation, the first request may further include at least one of the following information of the at least one network slice: identification information, time information, and area information.

In a possible implementation, the first information includes at least of the following information of the at least one network slice: identification information, time information, area information, a first maximum quantity of users, and service information, where the service information is used to determine a service status.

In a possible implementation, the service information includes at least one of the following information corresponding to a service: a service identifier, a first maximum quantity of users, first average service experience, first service experience range information, and first service satisfaction.

In another example, this embodiment of this application further provides an information sending apparatus. The information sending apparatus may be a second network element or a chip used in a second network element. The information sending apparatus includes a communications interface and one or more processors.

The information sending apparatus communicates with another device through the communications interface. When the one or more processors execute instructions, the information sending apparatus performs the information sending method described in any one of the second aspect or the possible implementations of the second aspect.

For example, the communications interface is configured to support the information sending apparatus in performing message/data receiving and sending steps that are performed on the information sending apparatus side and that are described in any one of the second aspect or the possible implementations of the second aspect. The processor is configured to support the information sending apparatus in performing a message/data processing step that is performed on the information sending apparatus side and that is described in any one of the second aspect or the possible implementations of the second aspect. For specific corresponding steps, refer to the descriptions in any one of the second aspect or the possible implementations of the second aspect. Details are not described herein again.

Optionally, the communications interface and the processor of the information sending apparatus are coupled to each other.

Optionally, the information sending apparatus may further include a memory, configured to store computer program code, where the computer program code includes instructions. Optionally, the processor, the communications interface, and the memory are coupled to each other.

For example, the communications interface in the another example of the fourth aspect may perform the steps performed by the sending unit and the receiving unit in the example of the fourth aspect, and the processor may perform the steps performed by the processing unit in the example of the fourth aspect.

According to a fifth aspect, an embodiment of this application provides a communications system. The communications system includes the user access control apparatus described in any one of the third aspect or the various possible implementations of the third aspect and the information sending apparatus described in any one of the fourth aspect or the various possible implementations of the fourth aspect.

According to a sixth aspect, an embodiment of this application provides a computer-readable storage medium. The computer-readable storage medium stores instructions. When the instructions are run on a computer, the computer is enabled to perform the user access control method described in the first aspect or the possible implementations of the first aspect.

According to a seventh aspect, this application provides a computer-readable storage medium. The computer-readable storage medium stores instructions. When the instructions are run on a computer, the computer is enabled to perform the information sending method described in the second aspect or the possible implementations of the second aspect.

According to an eighth aspect, this application provides a computer program product including instructions. When the instructions are run on a computer, the computer is enabled to perform the user access control method described in the first aspect or the possible implementations of the first aspect.

According to a ninth aspect, this application provides a computer program product including instructions. When the instructions are run on a computer, the computer is enabled to perform the information sending method described in the second aspect or the possible implementations of the second aspect.

According to a tenth aspect, an embodiment of this application provides a chip. The chip includes a processor and a communications interface. The communications interface is coupled to the processor. The processor is configured to run a computer program or instructions, to implement the user access control method according to the first aspect or the possible implementations of the first aspect. The communications interface is configured to communicate with another module outside the chip.

According to an eleventh aspect, an embodiment of this application provides a chip. The chip includes a processor and a communications interface. The communications interface is coupled to the processor. The processor is configured to run a computer program or instructions, to implement the information sending method according to the second aspect or the possible implementations of the second aspect. The communications interface is configured to communicate with another module outside the chip.

For beneficial effects of the second aspect to the eleventh aspect and the implementations of the second aspect to the eleventh aspect in this application, refer to the analysis of the beneficial effects in the first aspect and the implementations of the first aspect. Details are not described herein again.

DESCRIPTION OF EMBODIMENTS

Figure 1:
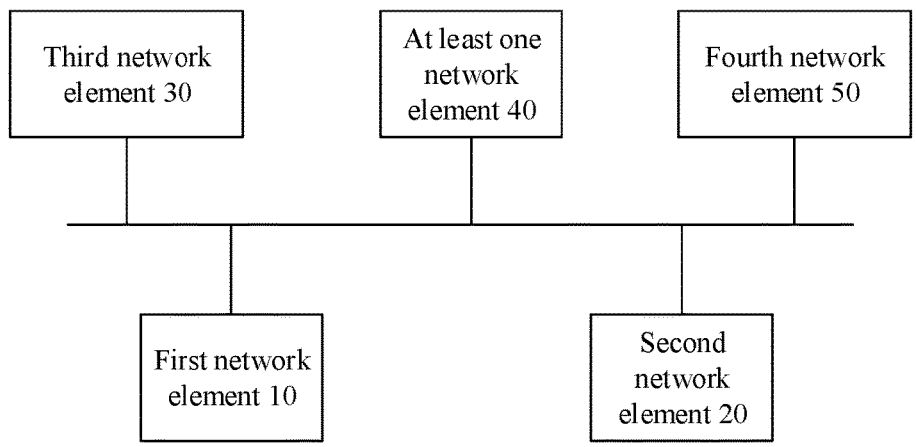
FIG. 1 is a schematic structural diagram of a communications system according to an embodiment of this application.

To clearly describe the technical solutions in the embodiments of this application, terms such as "first" and "second" are used in the embodiments of this application to distinguish between same items or similar items that have basically same functions and purposes. For example, a first network element and a second network element are merely intended to distinguish between different network elements, and are not intended to limit a sequence thereof. A person skilled in the art may understand that terms such as "first" and "second" do not limit a quantity or an execution sequence, and terms such as "first" and "second" do not indicate a definite difference.

It should be noted that in this application, the term such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the term "example" or "for example" or the like is intended to present a relative concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may be aware that: With evolution of the network architecture and emergence of new service scenarios, the technical solutions provided in the embodiments of this application are also applicable to similar technical problems.

In this application, "at least one" refers to one or more, and "a plurality of" refers to two or more. "and/or" describes an association relationship between associated objects and represents that three relationships may exist. For example, A and/or B may represent the following three cases: Only A exists, both A and B exist, and only B exists. A and B may be in a singular or plural form. The character "/" usually indicates an "or" relationship between the associated objects. "At least one of the following" or a similar expression thereof indicates any combination of the following, and includes any combination of one or more of the following. For example, at least one of a, b, or c may indicate: a, b, c, a and b, a and c, b and c, or a, b, and c, where a, b, and c may be singular or plural.

A system architecture and the service scenario described in the embodiments of this application are intended to describe the technical solutions in the embodiments of this application more clearly, and do not constitute a limitation on the technical solutions provided in the embodiments of this application. A person of ordinary skill in the art may be aware that: With evolution of the network architecture and emergence of new service scenarios, the technical solutions provided in the embodiments of this application are also applicable to similar technical problems. In the embodiments of this application, an example in which a provided method is applied to an NR system or a 5G network is used for description.

FIG. 1 is a schematic diagram of a communications system according to an embodiment of this application. The communications system includes a first network element 10 and a second network element 20 that communicates with the first network element 10.

The first network element 10 is configured to send a first request to the second network element 20, where the first request includes at least one of first indication information and second indication information.

The first indication information is used to indicate to report first information of at least one network slice to the first network element 10, and the second indication information is used to indicate that a first network slice in at least one network slice is a newly established network slice, a network slice on which a drive test is being performed, or a network slice for which no SLA is signed.

The second network element 20 is configured to: receive the first request from the first network element 10, determine the first information of the at least one network slice, and send a first response to the first network element 10, where the first response includes the first information of the at least one network slice. The first information of the at least one network slice is used to determine a relationship between quality and a quality requirement of the at least one network slice.

In addition, the first network element 10 is further configured to receive the first response from the second network element 20, where the first response includes the first information of the at least one network slice; and is configured to control user access to the first network slice based on the relationship between the quality and the quality requirement of the at least one network slice.

Specifically, for a specific implementation in which the first network element 10 is configured to control user access to the first network slice based on the relationship between the quality and the quality requirement of the at least one network slice, refer to descriptions in the following method embodiments. Details are not described herein.

Optionally, in an optional implementation, the communications system in this embodiment of this application may further include a third network element 30, configured to send a notification message to the first network element 10, so that the first network element 10 receives the notification message from the third network element, where the notification message includes third indication information, and the third indication information is used to indicate that the first network slice is a newly established network slice, a network slice on which a drive test is being performed, or a network slice for which no SLA is signed.

Optionally, in an optional implementation, the communications system provided in this embodiment of this application may further include at least one network element 40.

In this case, in one aspect, the first network element 10 is further configured to send a second request to the at least one network element corresponding to the at least one network slice, so that the at least one network element receives the second request from the first network element 10. The second request includes fourth indication information, and the fourth indication information is used to indicate to report first data that is in the at least one network element and that is corresponding to the at least one network slice to the second network element 20. According to another aspect, the second network element 20 sends a fourth request to the at least one network element 40, where the fourth request includes fifth indication information, and the fifth indication information is used to indicate the at least one network element to report the first data that is in the at least one network element and that is corresponding to the at least one network slice to the second network element.

Optionally, in an optional implementation, the communications system provided in this embodiment of this application may further include a fourth network element 50. In addition, the first network element 10 is further configured to send a third request to the fourth network element, so that the fourth network element 50 receives the third request, where the third request is used to request address information of the at least one network element; and the third request includes at least one of the following information corresponding to the at least one network slice: identification information, a network area, and time information. The fourth network element 50 is further configured to send the address information of the at least one network element to the first network element, so that the first network element 10 receives the address information of the at least one network element from the fourth network element 50.

It should be noted that mutual reference or reference may be made between the embodiments of this application. For example, for same or similar steps, mutual reference may be made between the method embodiments, the communications system embodiments, and the apparatus embodiments. This is not limited.

Optionally, the communications system shown in FIG. 1 may be applied to a current 5G network architecture and another future network architecture, which is not specifically limited in this embodiment of this application.

Figure 2:
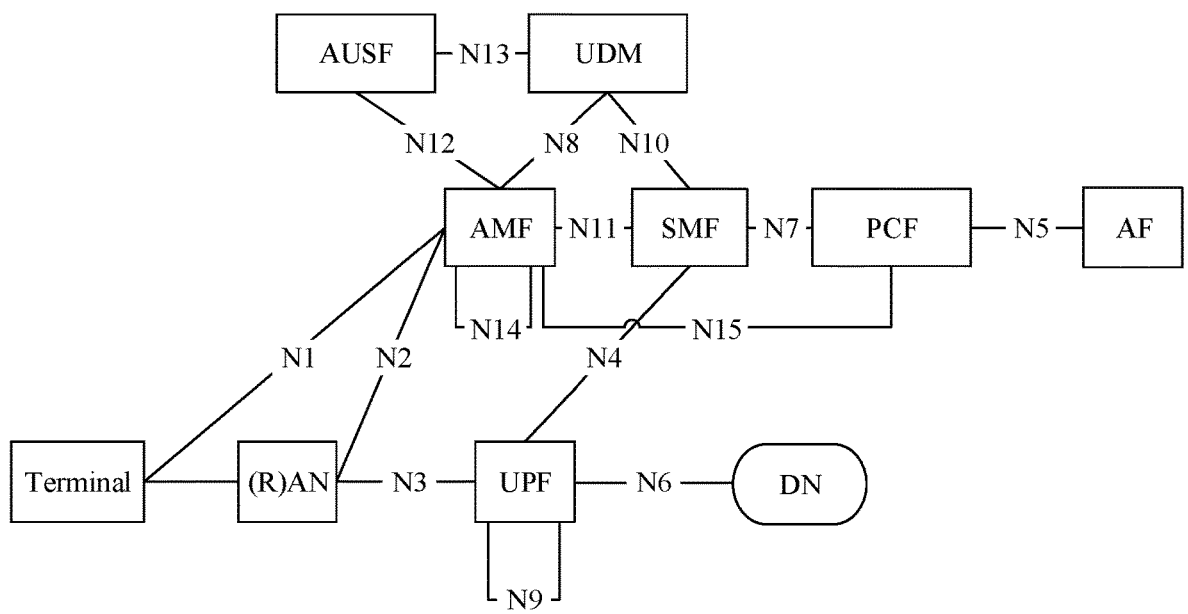
FIG. 2 is a schematic diagram of a 5G network architecture according to an embodiment of this application.

The following uses an example in which the communications system shown in FIG. 1 is applicable to the 5G network architecture, for example, uses an example in which the communications system shown in FIG. 1 is applicable to a 5G network architecture in a non-roaming scenario shown in FIG. 2.

For example, an example in which the communications system shown in FIG. 1 is applied to a current interface-based architecture in the non-roaming 5G network architecture is used. The first network element 10 and the second network element 20 may be network elements belonging to a 5G core (5GC) network, or may be network elements belonging to a network management network element.

For example, as shown in FIG. 2, a network element or an entity corresponding to the first network element 10 may be a 5G core (5GC) network element. For example, the network element or the entity corresponding to the first network element 10 may be a network slice selection function (NSSF) network element or an OAM network element in the non-roaming 5G network architecture shown in FIG. 2, for example, a network slice management function (NSMF) network element or a network slice subnet management function (NSSMF) network element. For example, the NSSMF network element may be a radio access network slice subnet management function (RAN-NSSMF) network element, a core network slice subnet management function (CN-NSSMF) network element, or a transport network slice subnet management function (TN-NSSMF) network element.

For example, the second network element 20 may be a 5GC network element, for example, a network data analytics function (NWDAF) network element or an OAM network element, for example, a management data analytics function (MDAF) network element, or may even be a data analytics network element on a RAN side.

The third network element 30 may be an OAM network element, for example, may be an NSMF network element, an NSSMF network element, or an MDAF network element. This is not limited in this embodiment of this application.

In addition, as shown in FIG. 2, the non-roaming 5G network architecture may further include an access device (for example, an access network (AN) device or a radio access network (RAN) device), a user plane function (UPF) network element, a data network (DN), an access and mobility management function (AMF) network element, an authentication server function (AUSF) network element, a session management function (SMF) network element, a unified data repository (UDR), unified data management (UDM), binding support function (BSF), a network exposure function (NEF) network element, a network repository function (NRF) network element, an application function (AF), and the like. This is not specifically limited in this embodiment of this application.

A terminal communicates with the AMF network element through a next generation network (N1) interface (N1 for short). The access device communicates with the AMF network element through an N2 interface (N2 for short). The access device communicates with the UPF network element through an N3 interface (N3 for short). The UPF network element communicates with the DN through an N6 interface (N6 for short). Any two UPF network elements communicate with each other through an N9 interface (N9 for short). The UPF network element communicates with the SMF network element through an N4 interface (N4 for short). The AMF network element communicates with the SMF network element through an N11 interface (N11 for short). The AMF network element communicates with the UDM network element through an N8 interface (N8 for short). The SMF network element communicates with a PCF network element through an N7 interface (N7 for short). The SMF network element communicates with the UDM network element through an N10 interface (N10 for short). The AMF network element communicates with the AUSF network element through an N12 interface (N12 for short). The AMF network element communicates with the NSSF network element through an N22 interface (N22 for short). The AUSF network element communicates with the UDM network element through an N13 interface (N13 for short). The UDM network element communicates with the UDR network element. The PCF network element communicates with the UDR network element. The BSF network element communicates with the PCF network element and the SMF network element.

Figure 3:
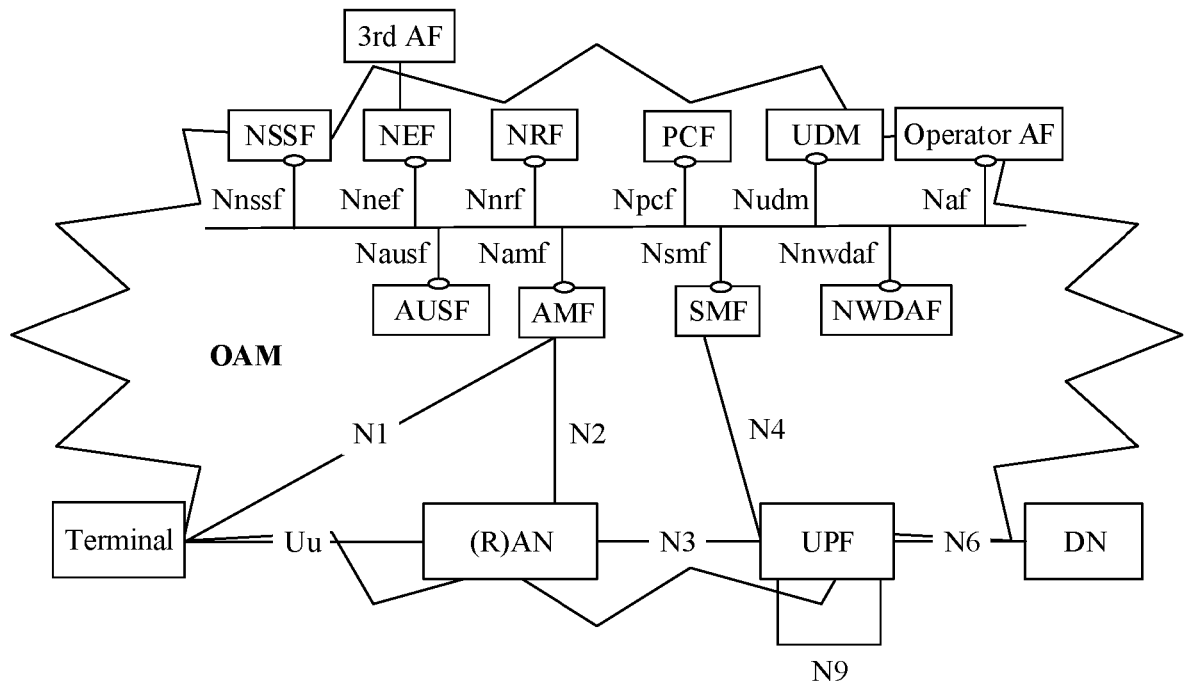
FIG. 3 is another schematic diagram of a 5G network architecture according to an embodiment of this application.

FIG. 3 shows an architecture based on a service-oriented interface in a non-roaming 5G network architecture. A difference from the architecture in FIG. 3 lies in that control plane network elements in a 5GC in FIG. 3 may further interact with each other through a service-oriented interface. For example, the AMF network element, the AUSF network element, the SMF network element, the UDM network element, the UDR network element, the NRF network element, the NEF network element, the NSSF network element, or the PCF network element interacts with one another through a service-oriented interface. For example, an external service-oriented interface provided by the AMF network element may be Namf. An external service-oriented interface provided by the SMF network element may be Nsmf. An external service-oriented interface provided by the UDM network element may be Nudm. An external service-oriented interface provided by the UDR network element may be Nudr. An external service-oriented interface provided by the PCF network element may be Npcf. An external service-oriented interface provided by the BSF network element may be Nbsf. An external service-oriented interface provided by the NEF network element may be Nnef. An external service-oriented interface provided by the NRF network element may be Nnrf. An external service-oriented interface provided by the NSSF network element may be Nnssf. An external service-oriented interface provided by an NWDAF network element may be Nnwdaf. It should be understood that, for related descriptions of names of various service-oriented interfaces in FIG. 3, refer to a 5G system architecture diagram in the 23501 standard. Details are not described herein.

It should be noted that FIG. 2 and FIG. 3 merely show, for example, one UPF network element and one SMF network element. Certainly, the non-roaming 5G network architecture may include a plurality of UPF network elements and SMF network elements, for example, include an SMF network element 1 and an SMF network element 2. This is not specifically limited in this embodiment of this application. For a connection manner between the network elements, refer to the non-roaming 5G network architecture shown in FIG. 2 or FIG. 3. Details are not described herein again.

It should be understood that when the terminal accesses the communications system shown in FIG. 2 or FIG. 3 through an access device, a network element (for example, the first network element 10) in the 5GC allocates one or more network slices to the terminal. Each network slice may include one or more of the UPF network element, the SMF network element, the NRF network element, and the PCF network element. The plurality of network slices may share some network functions. A set of shared network functions may be referred to as a control plane shared network function (CCNF). For example, the CCNF includes one or more of the AMF network element and the NSSF network element. Each network slice corresponds to at least one access device.

One first network element 10 may manage a plurality of AMF network elements, and the access device accesses a core network through the AMF network element. One AMF network element may manage a plurality of access devices.

In addition, a network element or an entity corresponding to the fourth network element 50 may be an NRF network element, an NWDAF network element, a domain name service (DNS) server, or an OAM network element.

A network element or an entity corresponding to the at least one network element 40 may be at least one of a terminal, an access device, an AMF network element, an SMF network element, a UPF network element, a PCF network element, an AF network element, or an OAM network element.

Network slicing refers to customization of different logical networks on a physical or virtual network infrastructure based on different service requirements. A network slice may be a complete end-to-end network that includes a terminal, an access network, a transport network, a core network, and an application server, can provide a complete communications service, and has a specific network capability. The network slice may be a communications resource for ensuring that a bearer service or a service can meet an SLA requirement, or may also be considered as a combination of a network function and a communications resource that are required to complete a communications service or some communications services.

One network slice corresponds to one slice type and is identified by using single network slice selection assistance information (S-NSSAI). One network slice may have a plurality of network slice instances (NSI), to distinguish between different tenants and different areas.

An NSI is an actually running logical network that can meet a particular network feature or service requirement. A complete network slice instance may provide a complete end-to-end network service, and the network slice instance may include one or more network slice subnet instances (NSSI) and one or more network function (NF) instances.

The access device in this embodiment of this application may include a RAN device, an AN device, a gNodeB device, an eNodeB device, a UMTS terrestrial radio access network (UTRAN) device, and an E-UTRAN (evolved UTRAN) device.

As shown in FIG. 2 or FIG. 3, the OAM network element may cover network elements of the access network and the core network, and may collect data from these network elements of the access network and the core network.

It should be noted that both a 3rd AF network element and an operator AF in FIG. 2 or FIG. 3 belong to an AF network element. A difference lies in that the 3rd AF network element (for example, a WeChat service server or an Alipay payment service server) is not controlled by an operator, but the operator AF network element (for example, a proxy-call session control function (P-CSCF) network element in an IP multimedia system is controlled by the operator. The 3rd AF network element needs to interact with the NWDAF network element through the NEF network element.

It should be noted that names of interfaces between the network elements in FIG. 2 or FIG. 3 are merely examples, and the interfaces may have other names during specific implementation. This is not specifically limited in this embodiment of this application.

It should be noted that the access network device, the AF network element, the AMF network element, the SMF network element, the AUSF network element, the UDM network element, the UPF network element, the PCF network element, and the like in FIG. 2 or FIG. 3 are merely names, and the names do not constitute any limitation on the devices. In a 5G network and another future network, network elements corresponding to the access device, the AF network element, the AMF network element, the SMF network element, the AUSF network element, the UDM network element, the UPF network element, and the PCF network element may have other names. This is not specifically limited in this embodiment of this application. For example, the UDM network element may alternatively be replaced with a home subscriber server (HSS), a user subscription database (USD), a database entity, or the like. A general description is provided herein, and details are not described again subsequently.

Optionally, the terminal in the embodiments of this application may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, in this application, the devices mentioned above are collectively referred to as the terminal.

Optionally, the access device in this embodiment of this application is a device that accesses a core network. For example, the access device may be a base station, a broadband network gateway (BNG), an aggregation switch, a non-3rd generation partnership project (3GPP) access device, or the like. There may be base stations in various forms, for example, a macro base station, a micro base station (also referred to as a small cell), a relay station, and an access point.

Functions of the network elements in FIG. 2 or FIG. 3 are as follows.

Main functions of the UPF network element include user plane-related functions, such as data packet routing and transmission, packet detection, service usage reporting, QoS processing, lawful interception, uplink packet detection, and downlink data packet storage.

A main function of the AMF network element includes a function related to access and mobility, such as connection management, mobility management, registration management, access authentication and authorization, reachability management, or security context management.

A main function of the SMF network element includes a function related to a session, such as session management (for example, session establishment, modification, and release, including tunnel maintenance between the UPF and the AN), selection and control of the UPF network element, service and session continuity (SSC) mode selection, or roaming.

Main functions of the PCF network element include functions related to a policy, such as formulating a unified policy, providing policy control, and obtaining subscription information related to a policy decision from the UDR.

A main function of the NSSF network element includes selecting a group of network slice instances for the terminal, determining allowed NSSAI and determining an AMF network element set that can serve the terminal, or the like.

Main functions of the NRF network element include a service discovery function and maintaining NF text of an available network function (NF) instance and a service supported by the NF instance.

The AF network element interacts with a 3GPP core network to provide a service, including interacting with the NEF, interacting with a policy architecture, or the like.

Main functions of the NEF network element include securely exposing a service and a capability that are provided by a 3GPP network function, including internally exposing the service and the capability, exposing the service and the capability to a third party, or the like, and converting or translating information exchanged with the AF and internal network function interaction information, such as an AF service identifier and internal 5G core network information, such as a DNN and S-NSSAI.

The UDM supports processing of a letter of credence for authentication, user identity processing, access authorization, registration and mobility management, subscription management, short message management, or the like in a 3GPP authentication and key agreement mechanism.

The AUSF network element interacts with the UDM to obtain user information, and performs an authentication-related function, for example, generating an intermediate key.

The UDR is configured to store subscription data, policy data, application data, and the like.

Figure 4:
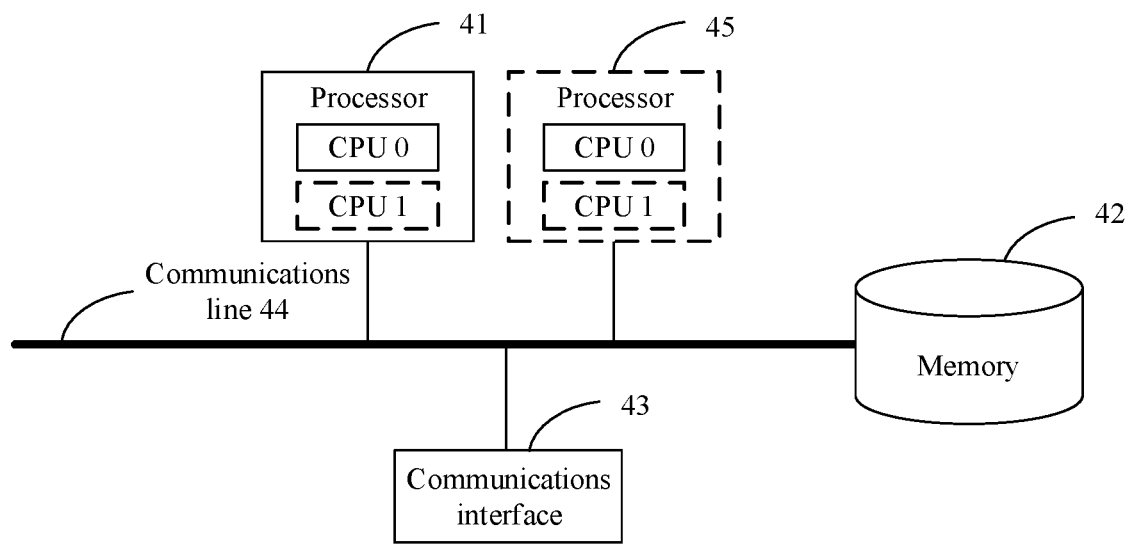
FIG. 4 is a schematic structural diagram of a communications device according to an embodiment of this application.

FIG. 4 is a schematic diagram of a hardware structure of a communications device according to an embodiment of this application. The communications device includes a processor 41, a communications line 44, and at least one communications interface (where FIG. 4 is merely described by using an example in which the communications device includes a communications interface 43).

Optionally, the communications device may further include a memory 42.

The processor 41 may be a general-purpose central processing unit (CPU), a microprocessor, an application-specific integrated circuit (ASIC), or one or more integrated circuits configured to control program execution of the solutions of this application.

The communications line 44 may include a channel for transmitting information between the foregoing components.

The communications interface 43 is any apparatus such as a transceiver, and is configured to communicate with another device or a communications network such as Ethernet, a radio access network (RAN), or a wireless local area network (WLAN).

The memory 42 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 42 is not limited thereto. The memory may exist independently, and is connected to the processor through the communications line 44. Alternatively, the memory may be integrated with the processor.

The memory 42 is configured to store computer-executable instructions for performing the solutions of this application, and the processor 41 controls execution of the computer-executable instructions. The processor 41 is configured to execute the computer-executable instructions stored in the memory 42, to implement a policy control method provided in the following embodiment of this application.

Optionally, the computer-executable instructions in the embodiments of this application may also be referred to as application program code. This is not specifically limited in the embodiments of this application.

During specific implementation, in an embodiment, the processor 41 may include one or more CPUs, for example, a CPU 0 and a CPU 1 in FIG. 4.

During specific implementation, in an embodiment, the communications device may include a plurality of processors, for example, the processor 41 and a processor 45 in FIG. 4. Each of the processors may be a single-core processor (single-CPU) or a multi-core processor (multi-CPU). The processor herein may be one or more devices, circuits, and/or processing cores for processing data (for example, computer program instructions).

The following describes in detail a user access control method and an information sending method provided in the embodiments of this application with reference to FIG. 1 to FIG. 3.

It should be noted that in the following embodiments of this application, names of messages between network elements, names of parameters in messages, or the like are merely examples, and may be other names during specific implementation. This is not specifically limited in the embodiments of this application.

Figure 5:
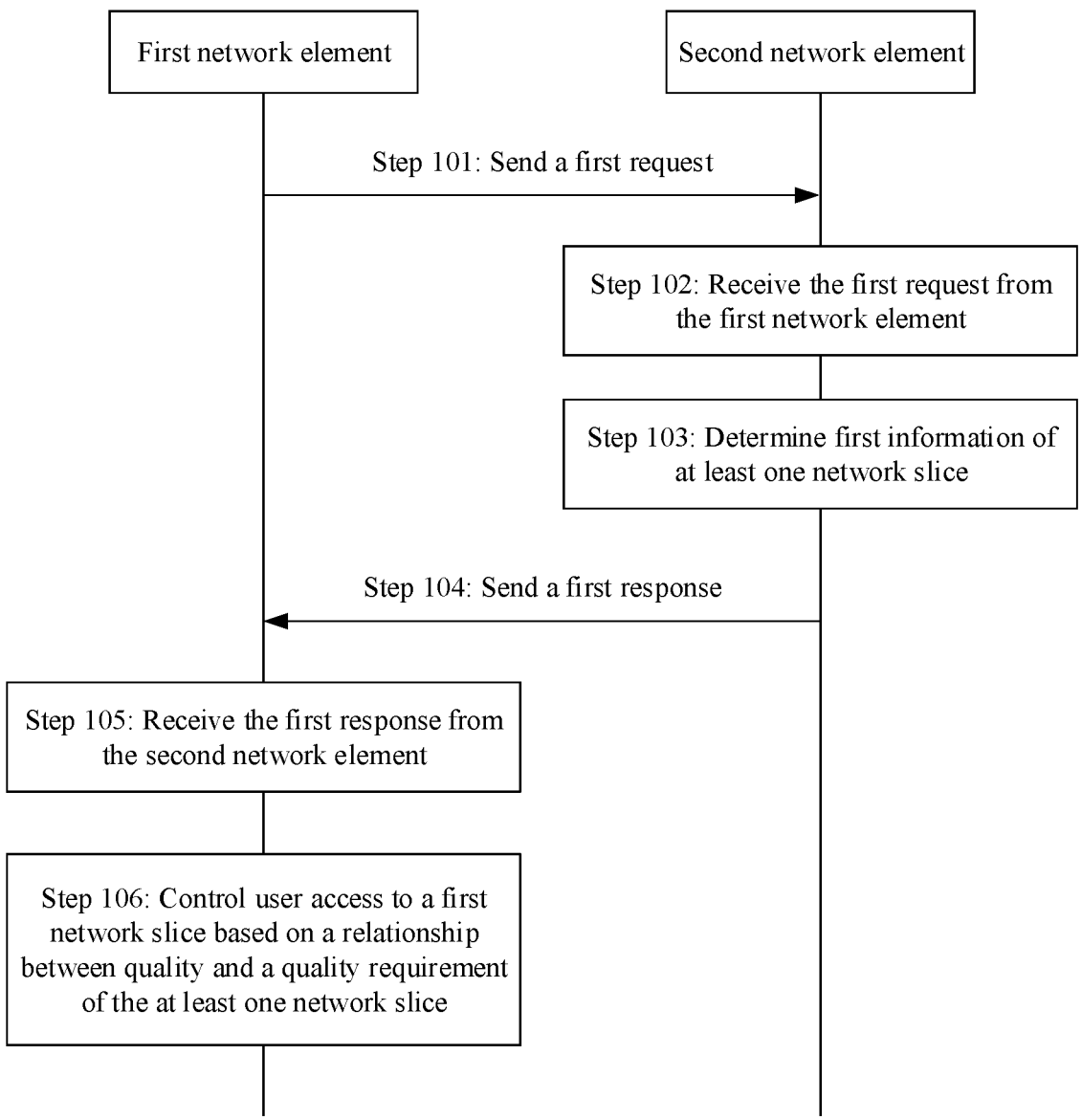
FIG. 5 to FIG. 9 are schematic diagrams of interaction between a user access control method and an information sending method according to an embodiment of this application.

An example in which the user access control method and the information sending method provided in the embodiments of this application are applied to the communications system shown in FIG. 1 is used. FIG. 5 shows a specific embodiment of interaction between a user access control method and an information sending method according to an embodiment of this application. The method includes the following steps Step 101: A first network element sends a first request to a second network element. The first request includes at least one of first indication information and second indication information.

Optionally, the first request is used to request first information of at least one network slice (NS) from the second network element.

For example, the first request includes the first indication information. Alternatively, for example, the first request includes the first indication information and the second indication information. Alternatively, for example, the first request includes the second indication information.

The first indication information is used to indicate (the second network element) to report the first information of the at least one network slice to the first network element. The second indication information is used to indicate that a first network slice is a newly established network slice, a network slice on which a drive test is being performed, or a network slice for which no SLA is signed.

Optionally, in this embodiment of this application, the first network slice and the at least one network slice are network slices in a same network area. Alternatively, the first network slice and the at least one network slice are network slices that run in a same time period in a same network area. Alternatively, the first network slice and the at least one network slice form one slice network or one network (an operator network).

It should be understood that the first network element sends the first indication information to the second network element, to trigger the second network element to report the first information of the at least one network slice. In this way, once the second network element has the first information of the at least one network slice, the second network element needs to report the first information to the first network element.

It should be understood that the first indication information may be further used to indicate the second network element to immediately report the first information of the at least one network slice to the first network element. That is, the first indication information indicates that the second network element should immediately prepare the first information of the at least one network slice, and immediately feed back the first information to the first network element after the preparation is completed.

It should be understood that the second indication information may also be used to trigger the second network element to report the first information of the at least one network slice. In this way, once the second network element has the first information of the at least one network slice, the second network element needs to report the first information to the first network element.

It should be understood that the second indication information may also be used to indicate the second network element to immediately report the first information of the at least one network slice to the first network element. That is, the second indication information indicates that the second network element should immediately prepare the first information of the at least one network slice, and immediately feed back the information to the first network element after the preparation is completed.

In this embodiment of this application, the first request carries the first indication information or the second indication information, so that the second network element can quickly send the first information of the at least one network slice to the first network element. Further, the first network element may determine a relationship between quality of the at least one network slice and a quality requirement of the network slice based on the first information of the at least one network slice, and further determine user access to the first network slice based on the relationship between the quality of the at least one network slice and the quality requirement of the network slice, thereby shortening a time for controlling user access to the first network slice.

Optionally, the first request may further carry filter information of each network slice in the at least one network slice. Filter information of one network slice is used to indicate a range in which the second network element collects first information of the network slice.

For example, the filter information of each network slice includes at least one of the following information: identification information, a network area, or time information.

It should be understood that some or all of other network slices than the first network slice in the at least one network slice each are a network slice for which an SLA is signed, or a network slice on which a drive test is performed, or an established network slice. The first network slice is a network slice in the at least one network slice, or may be a network slice (for example, a network slice used for background traffic transmission) other than the at least one network slice. The first network slice may represent one network slice, or may represent a group of newly established network slices, a network slice on which a drive test is being performed, a network slice for which no SLA is signed, or a plurality of network slices of a same type.

It should be noted that the first network element and the second network element may negotiate with each other on that if the second network element receives the first request from the first network element, the second network element needs to report the first information of the at least one network slice. In this case, the first request may not carry the first indication information. In this case, the first request may or may not carry the second indication information.

Step 102: The second network element receives the first request from the first network element.

Step 103: The second network element determines the first information of the at least one network slice.

The first information of the at least one network slice is used to determine the relationship between the quality and the quality requirement of the at least one network slice.

In this embodiment of this application, the relationship between the quality and the quality requirement of the at least one network slice includes a relationship between quality of each network slice in the at least one network slice and a quality requirement of the network slice. For example, the at least one network slice includes an NS 1 and an NS 2. The relationship between the quality and the quality requirement of the at least one network slice includes a relationship between quality of the NS 1 and a quality requirement of the NS 1, and a relationship between quality of the NS 2 and a quality requirement of the NS 2.

For example, a relationship between quality of any network slice and a quality requirement of the any network slice includes that the quality of the any network slice is higher than slice quality required by the quality requirement of the any network slice, or that the quality of the any network slice is lower than slice quality required by the quality requirement of the any network slice, or that the quality of the any network slice is equal to slice quality required by the quality requirement of the any network slice.

It should be explained that the quality of the network slice is equal to the slice quality required by the quality requirement of the network slice does not mean that the quality of the network slice is completely equal to the slice quality required by the quality requirement of the network slice. As long as the quality of the network slice is close to the slice quality required by the quality requirement of the network slice or the quality of the network slice does not fluctuate greatly in the quality requirement of the network slice, it may be understood as that the quality of the network slice is equal to the slice quality required by the quality requirement of the network slice.

It should be understood that the second network element determines the first information of the at least one network slice includes: The second network element determines first information of each network slice in the at least one network slice.

According to one aspect, the first information of the at least one network slice may be the relationship between the quality and the quality requirement of the at least one network slice, that is, after determining the relationship between the quality and the quality requirement of the at least one network slice, the second network element sends the relationship to the first network element.

According to another aspect, the first information of the at least one network slice may be referred to as quality of experience (QoE) information, that is, used to reflect a status of the at least one network slice in a network to which the at least one network slice belongs, that is, a degree to which the network meets an SLA of any network slice in the at least one network slice.

In this embodiment of this application, the degree to which the network meets the SLA of the any network slice in the at least one network slice may be referred to as quality of the any network slice.

For example, the first information corresponding to each network slice in the at least one network slice includes at least one of the following information corresponding to the network slice: identification information, time information, area information, a first maximum quantity of users (Maximum Registration Users), and service information, where the service information is used to determine a service status, that is, a status of a service requirement satisfied by a current network.

In this embodiment of this application, the identification information of the network slice may be S-NSSAI, network slice selection assistance information (NSSAI), or an NSI ID.

A first maximum quantity of users of any network slice indicates a quantity of users currently accessing the any network slice, or a quantity of users who are allowed by a resource provided by a network to which the any network slice belongs and who access the any network slice, or a quantity of users who should access the any network slice and who are required by a third party.

It should be understood that there may be at least one service in any network slice. The service information may refer to service information of the at least one service.

For example, the service information includes at least one of the following information corresponding to the service: a service identifier (Application ID), a first maximum quantity of users (Maximum Users for the Application, that is, a maximum quantity of users of the service that can be satisfied by the current network or a quantity of users who are using the service in a current network slice), first average service experience (Average Service MOS, that is, average service experience corresponding to the service that can be satisfied by the current network or average service experience of the users who are using the service in the current network slice), first service experience range information (Service MOS Range, that is, a service experience range corresponding to the service that can be satisfied by the current network or a service experience range of the users who are using the service in the current network slice), first service satisfaction (how many percentages of UE's experience should be satisfied, that is, user satisfaction corresponding to the service that can be satisfied by the current network or a percentage of a quantity of users for which service experience requirements are met in the quantity of users who are using the service in the current network slice).

The first service satisfaction refers to a percentage of the quantity of users for which the service experience requirements are met in the quantity of users who use the service.

It should be understood that the time information in the first information of the at least one network slice is used to indicate a time period of first information of any network slice in the at least one network slice to the first network element. For example, the time information may be a time window, a timestamp, or a time interval.

For example, first information of a network slice 1 is from Mar. 1, 2018 to Mar. 8, 2018. In this way, the first network element can determine that the first information of the network slice 1 is collected from Mar. 1, 2018 to Mar. 8, 2018.

Area information of first information of any network slice is used to indicate a network area in which the any network slice can be supported to the first network element.

The network area in this embodiment of this application may be at least one of a tracking area (TA), a TA list, a routing area (RA), an RA list, a cell, a cell list, a global positioning system (GPS, a physical area), or a GPS list. A general description is provided herein, and details are not described again subsequently.

For example, any network slice in the at least one network slice is used as an example. When first information of the any network slice includes time information, area information, a first maximum quantity of users, and service information, the first information of the any network slice is used by the first network element to determine service information of at least one service and a first maximum quantity of users in the any network slice in a specified network area within a specified time period.

For example, when first information of the any network slice includes time information, area information, and service information, the first information of the any network slice is used by the first network element to determine service information of at least one service in the any network slice in a specified network area in a specified time period.

Step 104: The second network element sends a first response to the first network element, where the first response includes the first information of the at least one network slice.

It should be noted that the second network element may immediately send, based on the at least one of the first indication information or the second indication information when the second network element has the first information of the at least one network slice, the first information of the at least one network slice to the first network element by using the first response.

Step 105: The first network element receives the first response from the second network element.

It should be noted that the first network element may be ready to receive the first information of the at least one network slice from the second network element at any time based on the at least one of the first indication information or the second indication information sent to the second network element.

It should be understood that the network element may subscribe to, from the second network element by using step 101 to step 105, a status of the at least one network slice in the current network.

Step 106: The first network element controls user access to the first network slice based on the relationship between the quality and the quality requirement of the at least one network slice.

To control user access to the first network slice in time, and reduce impact of the first network slice on running quality of another network slice in the network area in which the first network slice is located, once receiving the first information of the at least one network slice from the second network element, the first network element immediately determines the relationship between the quality and the quality requirement of the at least one network slice based on the first information of the at least one network slice, and further controls user access to the first network slice based on the relationship between the quality and the quality requirement of the at least one network slice.

In this embodiment of this application, that the first network element controls user access to the network slice may be understood as that the first network element controls a quantity of terminals accessing the first network slice. A general description is provided herein. For subsequent descriptions of controlling user access to a network slice, refer to the description herein, and details are not described again subsequently.

Because a service status or a quantity of users accessing each network slice in the at least one network slice affects running quality of each network slice, step 106 may include the following meaning: The first network element controls user access to the first network slice based on a relationship between quality and a quality requirement of the first network slice. Alternatively, the first network element controls user access to the first network slice based on a relationship between quality and a quality requirement of another network slice different from the first network slice (for example, a network slice used for background traffic transmission) in the at least one network slice. Alternatively, the first network element controls user access to the first network slice based on the relationship between the quality and the quality requirement of the at least one network slice including the first network slice.

According to the user access control method provided in this embodiment of this application, to resolve a problem that a user access status or a service status of any one of a plurality of network slices in a same network area affects running quality of another network slice, the first network element sends the first request to the second network element, to indicate to the second network element that there is a newly established network slice, a network slice on which a drive test is being performed, or a network slice for which no SLA is signed (for example, the first network slice) in a network area. In this way, the second network element reports the first information of the at least one network slice in time to the first network element, so that the first network element can quickly obtain the relationship between the quality and the quality requirement of the at least one network slice. Then, the first network element may quickly control user access to the first network slice based on the relationship between the quality and the quality requirement of the at least one network slice, to avoid impact on running quality of another network slice. In addition, the first network element may learn of a status of the at least one network slice in the network in time based on the relationship between the quality and the quality requirement of the at least one network slice, and further gradually control user access to the first network slice based on the status of the at least one network slice in the network in a subsequent process.

Figure 6:
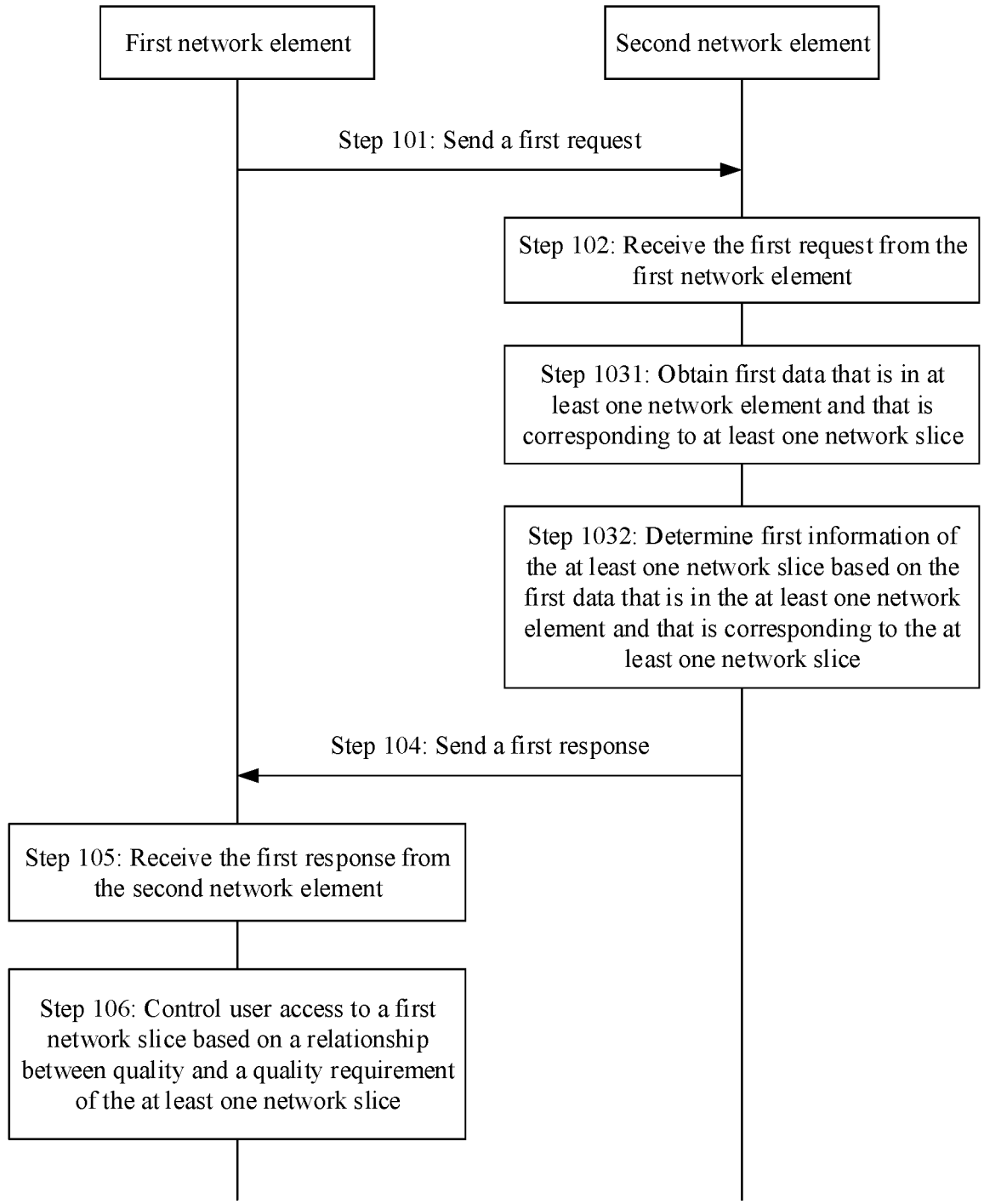

In an optional implementation, as shown in FIG. 6, step 103 in this embodiment of this application may be specifically implemented in the following manner:

Step 1031: The second network element obtains first data that is in the at least one network element and that is corresponding to the at least one network slice.

For example, the first data includes at least one of network data or service data. For example, the first data is flow-level network data or flow-level service data. For example, a flow level may be a QoS flow level or a service flow level. A QoS flow or a service flow may be understood as a service flow of a service in any network slice in the at least one network slice.

For example, the service data in this embodiment of this application may be data of parameters such as a service identifier of a service to which a flow belongs, a bandwidth, a delay, a packet loss rate, a jitter buffer, a transmission control protocol (TCP) congestion window, a TCP receive window, a media coding type, and a media encoding rate.

In this embodiment of this application, data of a parameter may be a size, a value, or a requirement of the parameter. For example, channel quality indicator (CQI) data may refer to a size or a value of a CQI. In this embodiment of the present disclosure, data, a size, a value, or a requirement of a parameter indicates a data value collected or obtained by a corresponding network element for the parameter. Such description is used in the following. For details, refer to the description herein, and details are not described again subsequently.

Network data in this embodiment of this application may be any one of the following parameters: a bandwidth, a delay, a packet loss rate, a reference signal received power (RSRP), a reference signal received quality (RSRQ), a block error rate (BLER) and a CQI, identification information of a network slice, a data network name (DNN), and other parameter data.

For example, the at least one network element may include any one of a terminal, an access device, an AMF network element, an SMF network element, a UPF network element, a PCF network element, an AF network element, or an OAM network element, or a combination of a plurality of network elements.

For example, in this embodiment of this application, first data from the AF network element or the terminal may be used as the flow-level service data. First data from the access device, the PCF network element, the AMF network element, the SM network element, the UPF network element, and the OAM network element is used as the flow-level network data.

For example, first data reported (for example, data of minimization of drive tests (MDT)) by the terminal through the OAM network element, a control plane network element (the access device, the AMF network element, the SMF network element, or the PCF network element), or a user plane network element (the access device, the UPF network element, or the AF network element) may be referred to as the network data, or may be referred to as the service data. First data (such as QoE data) reported by the terminal through the OAM network element, a control plane network element (the access device, the AMF network element, the SMF network element, or the PCF network element), or a user plane network element (the access device, the UPF network element, or the AF network element) may be referred to as the service data.

For example, first data (for example, MDT data) reported by the access device through the OAM network element, a control plane network element (the AMF network element, the SMF network element, or the PCF network element), or the user plane network element (the UPF network element or the AF network element) may be referred to as the network data, or may be referred to as the service data.

Because the at least one network element may be any one of a terminal, an access device, an AMF network element, an SMF network element, a UPF network element, a PCF network element, an AF network element, or an OAM network element, or a combination of a plurality of network elements, the first data comes from different network elements, and content of the first data may be different, the following separately describes, by using an example in which the at least one network element includes a fifth network element, specific content of the first data obtained from the fifth network element when the fifth network element is a terminal, an access device, an AMF network element, an SMF network element, a UPF network element, a PCF network element, an AF network element, or an OAM network element.

When the fifth network element is an AF network element, first data that is in the fifth network element and that is corresponding to the at least one network slice includes one or more of the following information: a service identifier of a service to which a flow belongs, a communication pattern parameter of the service to which the flow belongs, flow bit rate data of a first interface, delay data of the first interface, packet loss rate data of the first interface, packet data of the first interface, a timestamp, service experience data of the service to which the flow belongs, jitter buffer data, transmission control protocol TCP congestion window data, TCP receive window data, media coding type data, coding rate data of the media coding type data, and buffer data. The first interface is an interface between a UPF network element and a data network DN corresponding to the AF network element. For example, as shown in FIG. 2, the first interface may be the N6 interface.

For example, the communication pattern parameter of the service to which the flow belongs may include: at least one of a stationary indication, a terminal moving trajectory (UE's moving trajectory), a periodic communication indicator, a communication duration, a communication periodicity (Periodic time), a scheduled communication time, a maximum data packet transmission latency, a maximum data packet response time, and a quantity of buffered data packets (suggested number of downlink packets).

When the fifth network element is a PCF network element, first data that is in the fifth network element and that is corresponding to the at least one network slice includes one or more of the following information: a service identifier of a service to which a flow belongs, an identifier of a session in which the flow is located, a DNN of the session in which the flow is located, identification information of a network slice in which the flow is located, IP filter information, a media bandwidth requirement, traffic routing information, a jitter buffer requirement, a TCP congestion window requirement, a TCP receive window requirement, a media coding type requirement, a coding rate requirement in the media coding type requirement, a validity time window of the service identifier (which may be understood as a validity time window of the service corresponding to the service identifier), and a radio access technology type (for example, a 3rd generation partnership project (3GPP) access technology or a non-3GPP (e.g., Wi-Fi or a fixed network) access technology).

When the fifth network element is an SMF network element, first data that is in the fifth network element and that is corresponding to the at least one network slice includes one or more of the following information: an identifier of a flow, an identifier of a session in which the flow is located, a DNN of the session in which the flow is located, identification information of a network slice in which the flow is located, a validity time window of the identifier of the flow, and a radio access technology type.

When the fifth network element is a first UPF network element, first data that is in the fifth network element and that is corresponding to the at least one network slice includes one or more of the following information: an identifier of a flow, a timestamp, flow bit rate data of a second interface, flow bit rate data of a first interface, bit rate data of a third interface, delay data of the second interface, delay data of the first interface, delay data of the third interface, packet loss rate data of the first interface, packet loss rate data of the second interface, packet loss rate data of the third interface, packet data of the first interface, packet data of the second interface, and packet data of the third interface. The second interface is an interface between the first UPF network element and an access device. The third interface is an interface between the first UPF network element and a second UPF network element.

For example, the second interface may be the N3 interface shown in FIG. 2. The third interface is the N9 interface.

It should be understood that one flow may be transmitted through a plurality of UPF network elements. Therefore, the first UPF network element and the second UPF network element may be UPF network elements that transmit the flow.

When the fifth network element is an AMF network element, first data that is in the fifth network element and that is corresponding to the at least one network slice includes one or more of the following information: location information of a terminal corresponding to a flow, an identifier of a session in which the flow is located, a DNN of the session in which the flow is located, identification information of a network slice in which the flow is located, a validity time window of the identifier of the session in which the flow is located, and a radio access technology type.

When the fifth network element is an access device, first data that is in the fifth network element and that is corresponding to the at least one network slice includes one or more of the following information: location information of a terminal corresponding to a flow, an identifier of the flow, an identifier of a session in which the flow is located, identification information of a network slice in which the flow is located, a timestamp, flow bit rate data of a fourth interface, flow bit rate data of a second interface, delay data of the second interface, delay data of the fourth interface, RSRP data, RSRQ data, signal to interference plus noise ratio (SINR) data, CQI data, BLER data, a congestion level, packet loss rate data of the second interface, packet loss rate data of the fourth interface, packet data of the second interface, packet data of the fourth interface, a radio access technology type, and dual-connectivity indication information, where the fourth interface is an interface between the access device and a terminal. For example, the fourth interface is a Uu interface shown in FIG. 2.

When the fifth network element is a terminal, first data that is in the fifth network element and that is corresponding to the at least one network slice includes one or more of the following information: location information of a terminal corresponding to a flow, an identifier of the flow, an identifier of a session in which the flow is located, a DNN of the session in which the flow is located, identification information of a network slice in which the flow is located, flow bit rate data of a fourth interface, delay data of the fourth interface, packet loss rate data of the fourth interface, packet data of the fourth interface, a timestamp, processor CPU usage data, memory usage data, service experience data, jitter buffer data, TCP congestion window data, TCP receive window data, media coding type data, coding rate data of the media coding type data, RSRP data, RSRQ data, SINR data, CQI data, BLER data, and buffer data.

For example, the first data of the at least one network slice in the network element may further include content shown in Table 1.

TABLE 1

| Content of first data in different network elements | | |
|---|---|---|
| Domain | Data source | Data example |
| Terminal | Terminal | MDT data, RSRP, RSRQ, power headroom, packet delay, received signal strength indicator (RSSI), and round trip time<br>QoE metric, average throughput, initial playout delay, buffer leve, play list, MPD (media presentation description) information, playout delay for media start-up (initial media playout information), and device information |
| Access network | Access device | MDT Data, received interference power, data volume, scheduled IP throughput, and packet loss rate |
| Core network | AMF network element | Location information and S-NSSAI |
| | SMF network element | Packet data unit (PDU) session identifier (Session ID)/DNN/S-NSSAI/quality of service flow identity (QOS Flow Identity, QFI) |
| | PCF network element | Application ID/IP filter information/media/application bandwidth |
| Third party | AF network element | Application ID/service experience/timestamp/communication pattern parameters |

When the fifth network element is a network management network element, first data that is in the fifth network element and that is corresponding to the at least one network slice includes one or more of the following information: performance measurement data of an access device (as shown in Table 2), performance test data of a core network (as shown in Table 3), end-to-end key performance indicator (KPI) data (as shown in Table 4)

TABLE 2

| Performance measurement data | |
|---|---|
| Information (information) | Description |
| S-NSSAI | A slice identifier |
| UL or UL F1-U packet loss rate for gNB-CU | An uplink or downlink packet loss rate on an F1-U interface of a gNB-CU |
| DL packet drop rate for gNB-CU | A downlink packet drop rate on a gNB-CU |

TABLE 2-continued

Performance measurement data

| Information (information) | Description |
| --- | --- |
| Average packet delay DL in CU-UP or on F1-U for gNB-CU | An average downlink packet delay on an F1-U interface of a gNB-CU or on a CU-UP |
| Mean or maximum number of RRC connections for gNB-CU | An average or maximum quantity of RRC connections in a gNB-CU |
| Number of UE context release requests for gNB-CU | A quantity of terminal context release requests for a gNB-CU |
| DL F1-U packet loss rate for gNB-DU | An uplink/downlink packet loss rate on an F1-U interface of a gNB-DU |
| DL packet drop rate for gNB-DU | A downlink packet drop rate in a gNB-DU |
| Average packet delay DL in gNB-DU or DL air-interface | An average downlink packet delay in a gNB-DU or on a downlink air interface |
| IP latency in DL for gNB-DU | A downlink IP latency in a gNB-DU |
| Number of UE context release requests for gNB-DU | A quantity of terminal context release requests for a gNB-DU |
| DL or UL total PRB usage for gNB-DU | Downlink or uplink PRB (Physical Resource Block, PRB) usage in a gNB-DU |
| Distribution of DL or UL total PRB usage for gNB-DU | Downlink or uplink PRB distribution in a gNB-DU |
| Average DL or UL UE throughput in gNB-DU | An average downlink or uplink terminal throughput in a gNB-DU |
| Distribution of DL or UL UE throughput in gNB-DU | Downlink or uplink terminal throughput distribution in a gNB-DU |
| Volume of unrestricted UL or DL UE data in gNB-DU | A downlink or uplink terminal data volume in a gNB-DU |

TABLE 3

Performance test data

| Information | Description |
| --- | --- |
| S-NSSAI | Identification information of a network slice |
| Mean or maximum number of registered subscribers for AMF | An average or maximum quantity of registered subscribers on an AMF |
| Mean or maximum number of PDU sessions for SMF | An average or maximum quantity of packet data unit (PDU) sessions on an SMF |
| Number of incoming GTP data packets on the N3 interface, from (R)AN to UPF | A quantity of GTP data packets from a RAN to a UPF on an N3 interface |
| Number of outgoing GTP data packets of on the N3 interface, from UPF to (R)AN | A quantity of GTP data packets from a UPF to a RAN on an N3 interface |
| Number of octets of incoming GTP data packets on the N3 interface, from (R)AN to UPF | A quantity of bytes of GTP data packets from a RAN to a UPF on an N3 interface |
| Number of octets of outgoing GTP data packets on the N3 interface, from UPF to (R)AN | A quantity of bytes of GTP data packets from a UPF to a RAN on an N3 interface |
| N6 incoming or outgoing link usage | Uplink or downlink connection usage on an N6 interface |

TABLE 4

KPI data

| Information | Description |
| --- | --- |
| S-NSSAI | Identification information of a network slice |
| Registered subscribers of network and network slice instance | A quantity of subscribers in a network and network slice instance |
| Registration success rate of one single network slice instance | A registration success rate of one single network slice instance |
| End-to-end latency of 5G network | An end-to-end latency in a 5G network |
| Upstream throughput for network and network slice instance | An upstream throughput in a network and network slice instance |
| Downstream throughput for single network slice instance | A downstream throughput in a network and network slice instance |

TABLE 4-continued

KPI data

| Information | Description |
| --- | --- |
| Upstream throughput at N3 interface | An upstream throughput on an N3 interface |
| Downstream throughput at N3 interface | A downstream throughput on an N3 interface |
| RAN UE throughput | A terminal throughput in a RAN |
| Mean number of PDU sessions of network and network slice instance | An average quantity of PDU sessions in a network and network slice instance |
| Virtualised resource utilization of network slice instance | Utilization of virtualized resources in a network slice instance |

It should be understood that content in Table 2 to Table 4 is merely an example, and may further include more or less content in practice.

Step 1032: The second network element determines the first information of the at least one network slice based on the first data that is in the at least one network element and that is corresponding to the at least one network slice.

It should be understood that the first data that may be obtained by the second network element from the at least one network element includes flow-level network data and flow-level service data, and then the second network element collects statistics on a quantity of users in the network slice and a quantity of users of each service in the network slice, and calculates a MOS of each flow based on a service MOS model. Then, statistics may be further collected to obtain average service experience of services and service satisfaction.

The service MOS model is used to represent a mathematical relationship or a correspondence between service experience of the service and network data of the service on at least one network element in a network.

Specifically, for an implementation of step 1032, refer to descriptions in a conventional technology, details are not described herein.

In this embodiment of this application, the second network element may proactively subscribe to the first data that is in the at least one network element and that is corresponding to the at least one network slice from the at least one network element (which is referred to as proactive subscription by the second network element for short). Alternatively, the first network element triggers the at least one network element to report the first data that is in the at least one network element and that is corresponding to the at least one network slice to the second network element (which is referred to as triggering by the first network element for short). Therefore, the following describes specific implementations of step 1031 by separately using an example 1 and an example 2.

Example 1: The Second Network Element Performs Proactive Subscription

Figure 7:
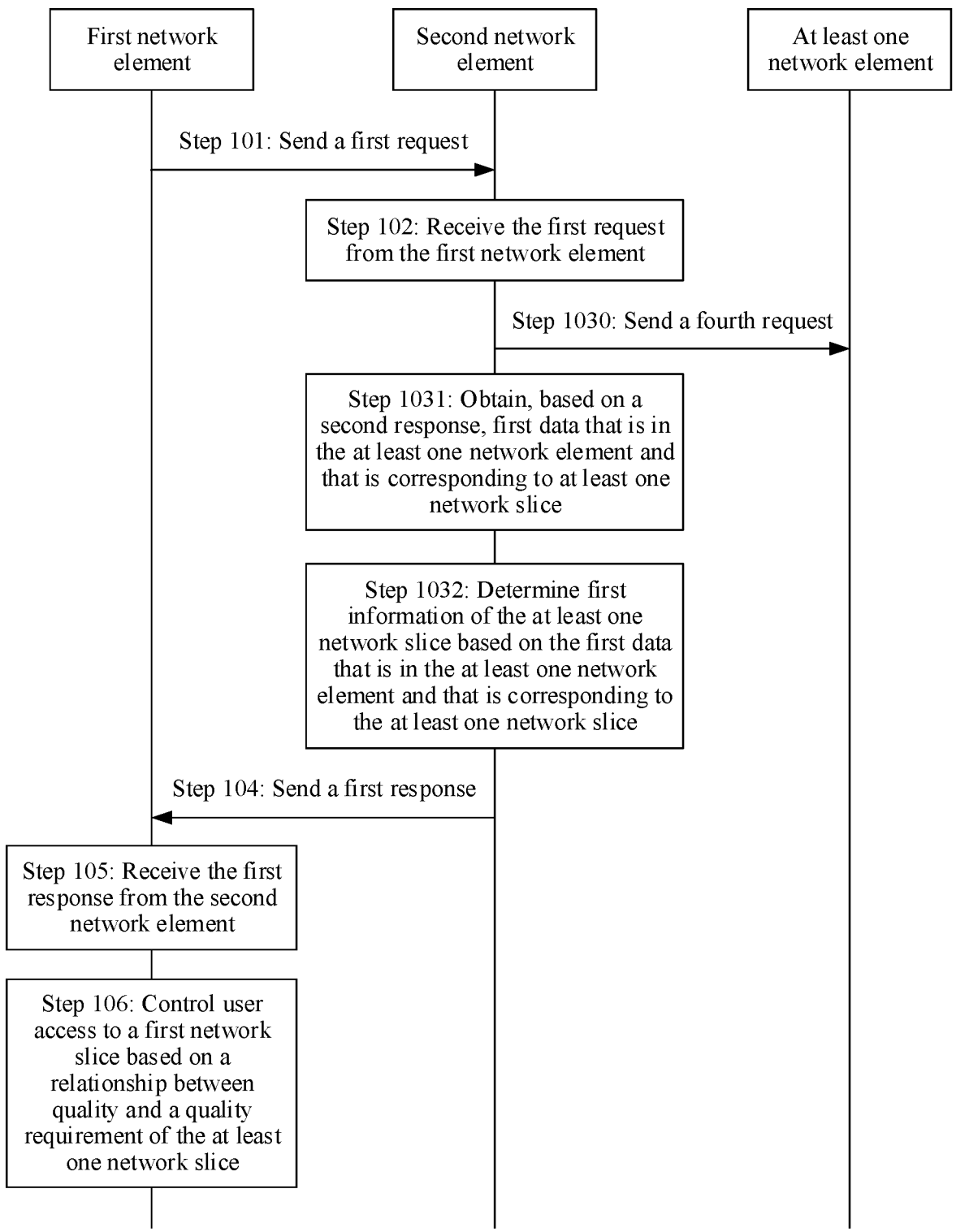

In the example 1, in an optional implementation, as shown in FIG. 7, before step 1031, the method provided in this embodiment of this application may further include the following step.

Step 1030: The second network element sends a fourth request to the at least one network element corresponding to the at least one network slice.

The fourth request includes fifth indication information, and the fifth indication information is used to indicate the at least one network element to report the first data that is in the at least one network element and that is corresponding to the at least one network slice to the second network element.

It should be understood that the fifth indication information is used to indicate to report the first data that is in the at least one network element and that is corresponding to the at least one network slice to the second network element once the at least one network element has the first data that is in the at least one network element and that is corresponding to the at least one network slice.

In this case, step 1031 may be specifically implemented in the following specific manner: The second network element receives a fourth response from the at least one network element, and the second network element obtains, based on the fourth response, the first data that is in the at least one network element and that is corresponding to the at least one network slice. The fourth response includes the first data that is in the at least one network element and that is corresponding to at least one network slice.

It should be understood that the second network element receives a fourth response from any network element in the at least one network element, to obtain first data that is of the at least one network slice and that is in the any network element.

In the example 1, when the second network element determines, based on the second indication information carried in the first request or second indication information from a network management network element, that the first network slice is a newly established network slice, a network slice on which a drive test is being performed, or a network slice for which no SLA is signed, step 1030 is performed. This is because the network management network element can establish a first network slice. Therefore, after establishing the first network slice, the network management network element may send identification information of the first network slice and the second indication information to the second network element. If the second network element determines that there is a first network slice in the at least one network slice, step 1030 may be performed.

It should be understood that if a network element in the at least one network element is a PCF network element, the fourth request is a subscription service operation and is a policy authorization subscription request (Npcf_PolicyAuthorization_Subscribe) of the PCF network element, and a service operation of sending first data that is of the at least one network slice and that is on the PCF network element by the PCF network element to the second network element is a policy authorization subscription notification (Npcf_PolicyAuthorization_Notify) of the PCF network element.

If a network element in the at least one network element is an NF network element (such as an AMF network element, an AF network element, or an SMF network element), the fourth request is a capability exposure subscription request (Nnf_EventExposure_Subscribe) of the NF network element, and a service operation of sending first data that is of the at least one network slice and that is on the PCF network element by the NF network element to the second network element is a capability exposure subscription notification (Nnf_EventExposure_Notify) of the NF network element. For example, when the NF network element is the AMF network element, Nnf_EventExposure_Subscribe is Namf_EventExposure_Subscribe, and Nnf_EventExposure_Notify is Namf_EventExposure_Notify.

If the at least one network element includes an access device and a terminal, the second network element first needs to send indication information to the network management network element, to indicate the network management network element to indicate, when the network management network element generates a measurement configuration file of QoE or MDT data, the terminal and the access device to report the QoE data and MDT data. It should be understood that the indication information is used to indicate the terminal and the access device to immediately report the QoE data.

Example 2: The First Network Element Performs Triggering

Figure 8:
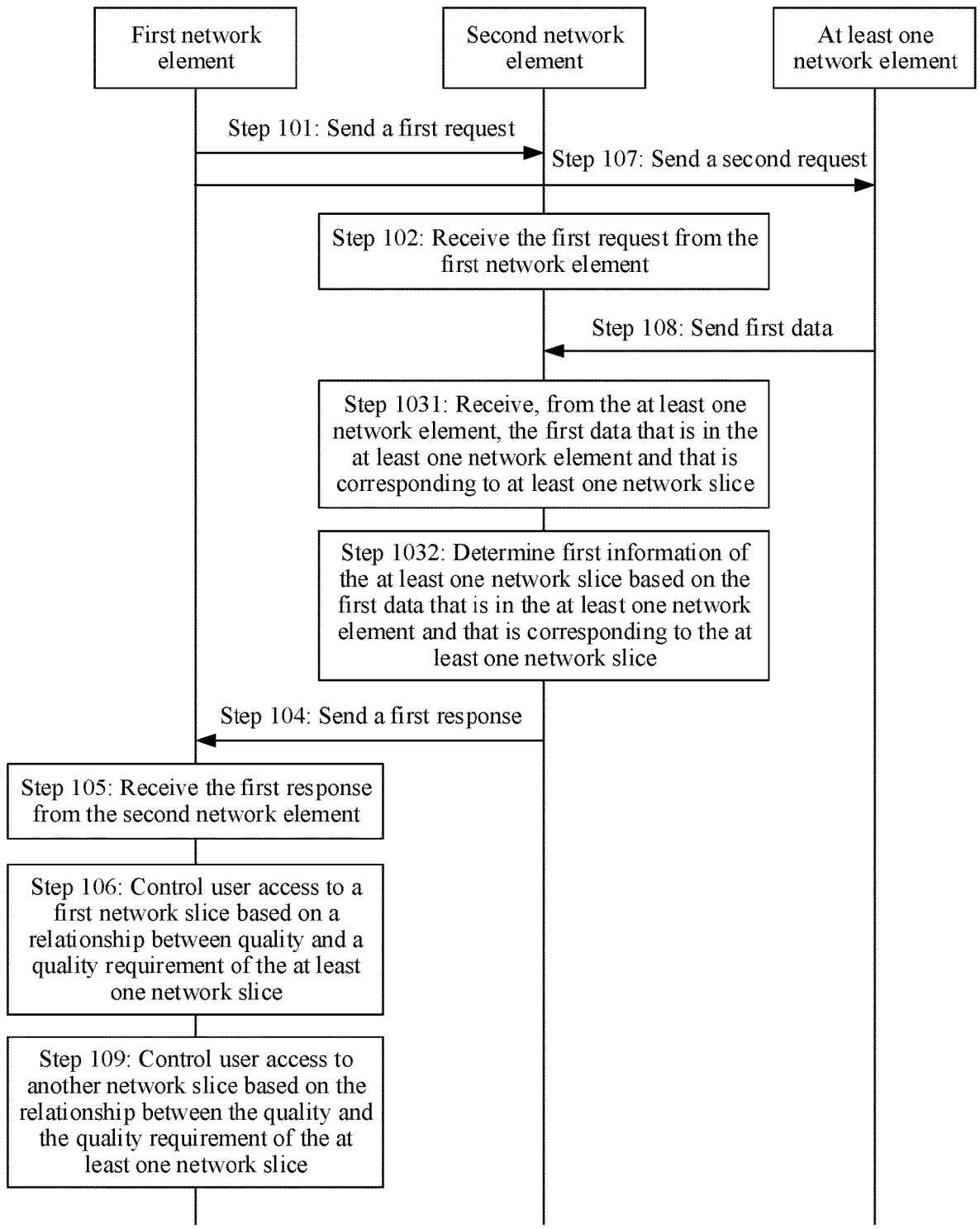

In the example 2, in an optional implementation, as shown in FIG. 8, the method provided in this embodiment of this application further includes the following steps.

Step 107: The first network element sends a second request to the at least one network element corresponding to the at least one network slice.

The second request includes fourth indication information, and the fourth indication information is used to indicate (the at least one network element) to report the first data that is in the at least one network element and that is corresponding to the at least one network slice to the second network element.

It should be understood that the fourth indication information is used to indicate to report the first data that is in the at least one network element and that is corresponding to the at least one network slice to the second network element once the at least one network element has the first data that is in the at least one network element and that is corresponding to the at least one network slice.

It should be understood that the second request is used to request the first data that is in the at least one network element and that is corresponding to the at least one network slice.

Optionally, the second request may further include a type of a network element in the at least one network element and filter information. An identifier of the second network element is used to determine the second network element.

Specifically, the first network element determines the fourth indication information based on that the first network slice is a newly established network slice, a network slice on which a drive test is being performed, or a network slice for which no SLA is signed.

For example, if the at least one network element includes a PCF network element, the second request sent by the first network element to the PCF network element is Npcf_PolicyAuthorization_Subscribe (policy authorization subscription of the PCF network element).

If the at least one network element includes an AMF network element or an SMF network element, the second request sent by the first network element to the AMF network element or the SMF network element is Namf_EventExposure_Subscribe (capability exposure subscription of the AMF network element) or Nsmf_EventExposure_Subscribe (capability exposure subscription of the SMF network element).

Step 108: The at least one network element receives the second request from the first network element, and sends the first data that is in the at least one network element and that is corresponding to the at least one network slice to the second network element.

Specifically, step 108 may be implemented in the following manner. After receiving the second request from the first network element, the at least one network element may determine the at least one network slice based on identification information of the at least one network slice, then may collect the first data that is of the at least one network slice and that is in the at least one network element, and finally may send a second response to the second network element based on the identifier of the second network element, where the second response includes the first data that is in the at least one network element and that is corresponding to the at least one network slice.

For example, that the at least one network element includes a terminal is used as an example. In this case, after receiving the first request, the terminal may send the first data that is in the terminal and that is corresponding to the at least one network slice to the second network element.

In this case, step 1031 may be specifically implemented in the following manner: The second network element receives the first data that is in the at least one network element and that is corresponding to the at least one network slice from the at least one network element.

It should be understood that the second network element may receive the second response from the at least one network element, to obtain the first data that is in the at least one network element and that is corresponding to the at least one network slice of the at least one network element from the second response.

It should be understood that, in the example 2, regardless of whether the first request sent by the first network element to the second network element carries the second indication information, the first network element may perform step 107. Certainly, if the first request carries the second indication information, step 107 and step 108 may be omitted.

Optionally, according to the method provided in this embodiment of this application, before step 107, the method provided in this embodiment of this application may further include: The first network element sends a third request to a fourth network element, where the third request is used to request address information of the at least one network element, so that the first network element obtains an address of the at least one network element from the fourth network element.

The third request includes at least one of the following information corresponding to the at least one network slice: an identifier, a network area, and time information of the network slice.

In an optional implementation, because the first network slice is a newly established network slice, a network slice on which a drive test is being performed, or a network slice for which no SLA is signed, the first network element may gradually control user access to the first network slice. In this way, in one aspect, quality of the first network slice can be higher than a quality requirement of the first network slice. In addition, impact of adding the first network slice on running quality of another network slice in the at least one network slice can be avoided. Therefore, to gradually control user access to the first network slice, step 106 in this embodiment of this application may be implemented in any one of the following manner 1 to manner 3.

Manner 1: The first network element determines that the quality of the first network slice is higher than the quality requirement of the first network slice, and the first network element increases a quantity of users accessing the first network slice.

It should be understood that the quality of the first network slice is higher than the quality requirement of the first network slice is that the current network can exceed the quality requirement of the first network slice. Therefore, a new user may continue to be admitted to the first network slice.

For example, the first network element determines the quality requirement of the first network slice based on an indication of the network management network element or an operator configuration.

Specifically, if the quality of the first network slice is higher than the quality requirement of the first network slice, it indicates that an air interface resource allocated by an access device corresponding to the first network slice to the first network slice is excessive, and an SLA status of the first network slice may be denoted as a first state (for example, an excess state or an overfitting state).

For example, if the quality of the first network slice is 95%, that is, a degree to which the network can meet an SLA of the first network slice is 95%, and the quality requirement of the first network slice is 90%, because 95%/90%=105.6%>100%, it indicates that the quality of the first network slice is higher than the quality requirement of the first network slice, or an air interface resource allocated by the access device of the first network slice to the first network slice is excessive, which is recorded as an SLA overfitting state.

Although the quality of the first network slice is higher than the quality requirement of the first network slice, it is possible that a first maximum quantity of users who have accessed the first network slice is greater than or equal to a second maximum quantity of users who are required to access the first network slice, or it is also possible that a first maximum quantity of users who have accessed the first network slice is less than a second maximum quantity of users who are required to access the first network slice. Therefore, the manner 1 may be specifically implemented in the following manner:

If the first network element determines that the quality of the first network slice is higher than the quality requirement of the first network slice, and the first maximum quantity of users in the first network slice is less than the second maximum quantity of users, the first network element increases users accessing the first network slice.

It should be understood that to ensure service quality of the first network slice, when increasing the users accessing the first network slice, the first network element may control the first maximum quantity of users finally registered in the first network slice to be equal to the second maximum quantity of users.

For example, if the first network element determines that a percentage of the quality of the first network slice to the quality requirement of the first network slice is 120%, and a tenant requires that the second maximum quantity of users in the first network slice is ten million, but the current first maximum quantity of users in the first network slice is one million, it indicates that the access device allocates an excessive air interface resource to the first network slice. Therefore, more users can access the first network slice.

Manner 2: The first network element determines that the quality of the first network slice is lower than the quality requirement of the first network slice, and the first network element reduces a quantity of users accessing the first network slice.

It should be understood that the quality of the first network slice is lower than the quality requirement of the first network slice, that is, the current network does not meet the quality requirement of the first network slice. Therefore, users allowed to access the first network slice need to be reduced.

Specifically, if the quality of the first network slice is lower than the quality requirement of the first network slice, it indicates that an air interface resource allocated by an access device corresponding to the first network slice to the first network slice is insufficient, and an SLA status of the first network slice may be recorded as a second state (for example, an underfitting state).

Specifically, if a degree to which the network can meet an SLA of the first network slice is 80%, the quality requirement of the first network slice is 90%. Because 80%/90%=88.9%, it means that the air interface resource allocated by the access device to the first network slice is insufficient, and the first network slice is recorded as a slice SLA underfitting state.

Although the quality of the first network slice is lower than the quality requirement of the first network slice, it is possible that a first maximum quantity of users in the first network slice is less than or equal to a second maximum quantity of users, or a first maximum quantity of users in the first network slice is greater than a second maximum quantity of users. Therefore, the manner 2 may be specifically implemented in the following manner:

When the first network element determines that the quality of the first network slice is lower than the quality requirement of the first network slice, if the first network element determines that the first maximum quantity of users in the first network slice is greater than the second maximum quantity of users, the first network element reduces users accessing the first network slice. If the first network element determines that the first maximum quantity of users in the first network slice is less than or equal to the second maximum quantity of users, the first network element keeps a quantity of users currently accessing the first network slice unchanged.

It should be understood that the first network element may enable a reduced quantity of users accessing the first network slice to be less than or equal to the second maximum quantity of users.

Manner 3: The first network element determines that the quality of the first network slice is equal to the quality requirement of the first network slice, and the first network element keeps a quantity of users accessing the first network slice unchanged.

In this embodiment of this application, that quality of a network slice is equal to a quality requirement of the network slice indicates that the quality of the network slice is completely equal to the quality requirement of the network slice, or an error between the quality of the network slice and the quality requirement of the network slice falls within a preset range. The preset range may be set based on a requirement. This is not limited in this embodiment of this application.

In conclusion, to avoid impact on running quality of another network slice in the at least one network slice, for the first network slice in the at least one network slice, the first network element may gradually control user access to the first network slice. For example, the first network element may control a quantity of users accessing the first network slice to be one million. Then, if SLA overfitting occurs in the first network slice, that is, service experience of the one million users can be fully satisfied and exceeds a tenant requirement, for example, second service satisfaction of a service 1 required by the tenant is 90%, but the first network element finds through observation that first service satisfaction of the service 1 in the first network slice reaches 95%, the first network element may control more users to access the first network slice, for example, add another one million users to the first network slice.

In this embodiment of this application, for a process of controlling user access to the network slice by the first network element, refer to descriptions in the conventional technology. Details are not described herein in this embodiment of this application.

Optionally, that the first network element determines that the quality of the first network slice is higher than the quality requirement of the first network slice includes: The first network element determines that quality of any network slice in the at least one network slice is lower than a quality requirement of the any network slice, and the first network element determines that the quality of the first network slice is higher than the quality requirement of the first network slice. Alternatively, the first network element determines that quality of N network slices in the at least one network slice is lower than quality requirements of the N network slices, and the first network element determines that the quality of the first network slice is higher than the quality requirement of the first network slice. N is an integer greater than or equal to 1. Alternatively, if the first network element determines that quality of some or all network slices in the at least one network slice is less than or equal to preset average quality, the first network element determines that the quality of the first network slice is higher than the quality requirement of the first network slice. It should be understood that the preset average quality may be preconfigured for the first network element.

Optionally, that the first network element determines that the quality of the first network slice is higher than the quality requirement of the first network slice includes: The first network element determines first information of the first network slice, determines the quality of the first network slice, and further determines that the quality of the first network slice is higher than the quality requirement of the first network slice.

It should be noted that the foregoing two manners indicate an optional manner in which the first network element determines that the quality of the first network slice is higher than the quality requirement of the first network slice. A specific implementation or algorithm belongs to internal behavior of the first network element. This is not limited in this embodiment of this application.

For example, the at least one network slice includes an NS 1, an NS 2, and an NS 3. The first network slice is the NS 1. If a slice management control network element determines that quality of the NS 2 is lower than a quality requirement of the NS 2, the slice management control network element determines that quality of the NS 1 is higher than the quality requirement of the first network slice.

It should be understood that in this embodiment of this application, after the first network element obtains the first information of the at least one network slice, the method further includes: The first network element determines a relationship between the quality and the quality requirement of the at least one network slice.

If the first information of the at least one network slice includes the relationship between the quality and the quality requirement of the at least one network slice, the first network element may directly determine the relationship between the quality and the quality requirement of the at least one network slice based on the first information.

If the first information of the at least one network slice is QoE information, the method provided in this embodiment of this application may further include: The first network element determines the quality of the at least one network slice based on the first information of the at least one network slice, and determines the relationship between the quality and the quality requirement of the at least one network slice based on the quality of the at least one network slice and the quality requirement.

It should be understood that a quality requirement of each network slice in the at least one network slice on the first network element may be from an AF network element corresponding to the network slice, or may be from the network management network element, or may be manually configured by the tenant on the first network element through the operator.

For example, it is assumed that one network slice has only one service, the tenant requires that service experience (that is, a service MOS) be higher than 4.0 and that user service satisfaction be higher than 95%. For that the first network element determines the relationship between the quality and the quality requirement of the at least one network slice based on the first information of the at least one network slice, the following two cases may be implemented in the following manners.

In the first case, the first network element determines that the network can 120% meet a quality requirement of a network slice, that is, a service MOS in first information of the network slice is 4.8, and 98% of user service satisfaction is obtained. In this case, slice quality corresponding to the network slice is higher than slice quality required by the quality requirement of the network slice, and this may be referred to as overfitting.

In the second case, the first network element determines that the network can 80% meet a quality requirement of a network slice, that is, a service MOS in first information of the network slice is 3.2, and 76% of user service satisfaction is obtained. In this case, slice quality corresponding to the network slice is lower than slice quality required by the quality requirement of the network slice, and this may be referred to as underfitting.

It should be noted that, first, the foregoing embodiment is only one of methods for determining the relationship between the quality and the quality requirement of the network slice. In a specific more complex scenario, for example, when there are a plurality of services in a plurality of network slices, a more complex algorithm needs to be designed, for example, a correspondence between quality and a quality requirement of a network slice is obtained by comparing an included angle or a cosine value between two vectors, namely, (average service experience and user satisfaction) of the network slice and (an average service experience requirement and a user satisfaction requirement) of the network slice. However, these are implemented by an internal product of a data analytics network element. Then, in an actual operation process, introduction of a new network slice or a slice for which no slice SLA is signed may affect running quality of an existing network slice. Therefore, when quality indication information of a network slice is determined, first information of the network slice is similarly processed, and optionally first information of another network slice needs to be further referenced.

Optionally, if the first information of the at least one network slice is QoE information, the method provided in this embodiment of this application further includes: the first network element obtains requirement information, where the requirement information is used to indicate the quality requirement of the at least one network slice.

For example, the requirement information may include at least one of the identification information of the at least one network slice, the second maximum quantity of users, and service requirement information of at least one service. The service requirement information is used to indicate a requirement, of a service that can be satisfied by the network, required by the tenant.

The second maximum quantity of users indicates a maximum quantity of users who are required to be registered in the network slice, for example, ten million.

Optionally, the requirement information may further include at least one of area information and time information. In addition, the requirement information may further include a bandwidth requirement, a delay requirement, and the like.

For example, an AF network element sends the requirement information to the first network element through a PCF network element. In other words, the first network element obtains, through the PCF network element, the requirement information from the AF network element managed and controlled by the tenant. Alternatively, the requirement information may be configured by the operator on the first network element. Alternatively, the requirement information may be sent by the network management network element to the first network element.

Optionally, the AF network element may be managed and controlled by the tenant (for example, a network slice tenant).

For example, the service requirement information includes at least one of the application ID, the second maximum quantity of users (Required Maximum Users for the Application), second average service experience (Required Average Service MOS), second service experience range information (Requested Service MOS range), and second service satisfaction (How many percentages of UE's experience should be satisfied).

In this embodiment of this application, elements in the service requirement information have the following functions: For example, the second maximum quantity of users indicates a maximum quantity of users in a service, that is, a total quantity of users that use a service, that is, a maximum quantity, of users of the service that can be satisfied by the network, required by the tenant, for example, 10000. The service identifier is used to identify a service in the slice. The second average service experience is average service experience, of the service that can be satisfied by the network, required by the tenant. The second service experience range information is used to indicate a service experience requirement of the service, that is, a service experience range, of the service that can be satisfied by the network, required by the tenant. The second service satisfaction is user satisfaction, of the service that can be satisfied by the network, required by the tenant, that is, a percentage that is required by the tenant and that is of a quantity of users for which service experience requirements are met in a quantity of users of the service.

For example, the service in the network slice may be a voice service, and a range of a second MOS is [0.0, 5.0]. For example, a voice service experience requirement can be met only when the second MOS is greater than or equal to 3.0 and less than or equal to 5.0, that is, MOS=3.0 is a minimum requirement for meeting voice service experience. If it is met that the MOS is greater than or equal to 3.0, the MOS may be 4.0, 4.5, 5.0, or the like, which is progressively increased based on a degree of good experience. A higher MOS value indicates a stricter requirement on a QoS parameter corresponding to the voice service and a higher requirement on quality of the network slice. In a final analysis, a requirement on a network resource is higher. This may also be understood as that a requirement on a resource of the network slice is higher.

The second service satisfaction indicates a percentage that is required by a tenant of a service and that is of a quantity of users for which second service experience range information is met in a total quantity of users in the service.

Optionally, the percentage is a first threshold, that is, the percentage that is required by the tenant and that is of the quantity of services for which the second service experience range information is met in the total quantity of services in the service is greater than or equal to the first threshold. The first threshold is not limited in this embodiment of this application.

For example, the tenant usually raises a service satisfaction requirement to the operator. For example, for a voice service, it is required that a percentage of a quantity of services whose MOS is greater than or equal to 3.0 in a total quantity of services be greater than or equal to 95%.

It should be understood that the quality of the first network slice meets the quality requirement of the first network slice in step 106. In addition, it can be ensured that quality of another network slice in the at least one network slice meets a quality requirement of the another network slice.

The foregoing embodiment mainly describes a process in which the first network element controls user access to the first network slice based on the first information of the at least one network slice. In an actual process, if there is a first network slice in the at least one network slice, running quality of another network slice may be affected. In this case, the first network element may further control user access to the another network slice. For example, in some optional embodiments, as shown in FIG. 8, the method provided in this embodiment of this application further includes the following steps.

Step 109: The first network element controls, based on the relationship between the quality and the quality requirement of the at least one network slice, user access to another network slice different from the first network slice in the at least one network slice.

It should be understood that for a specific implementation of step 109, refer to the specific implementation of step 106, that is, the first network slice in step 106 or various possible implementations of step 106 may be replaced with the another network slice. Details are not described herein again.

It should be understood that if a quantity of other network slices is 0, step 109 may be omitted. In other words, a precondition for implementing step 109 is that the first network element has first information of at least two network slices. The at least two network slices include the first network slice.

Figure 9:
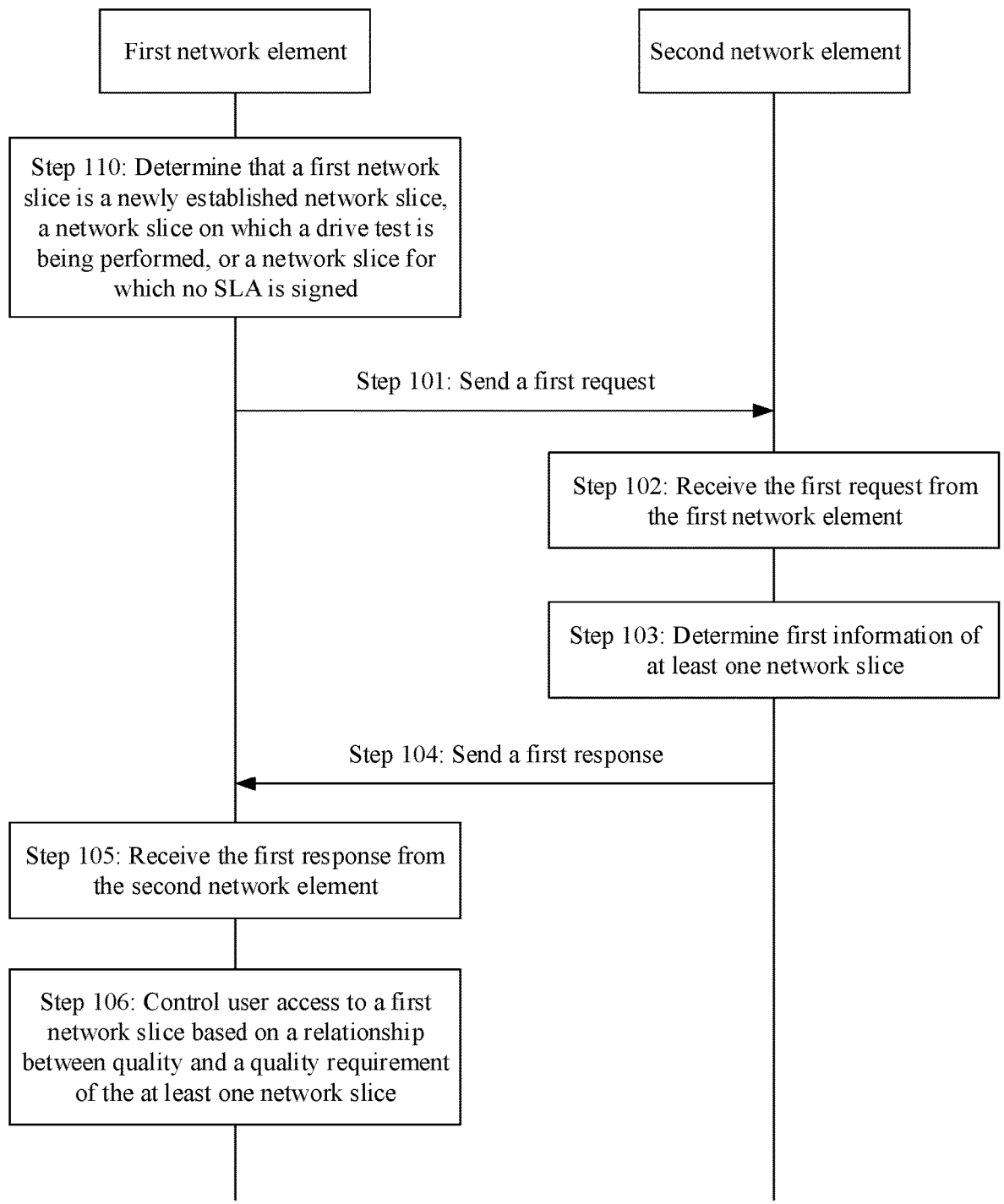

In some optional embodiments, as shown in FIG. 9, before step 101, the method provided in this embodiment of this application further includes the following steps.

Step 110: The first network element determines that the first network slice is a newly established network slice, a network slice on which a drive test is being performed, or a network slice for which no SLA is signed.

It should be understood that the first network element manages the at least one network slice. If the first network element determines that there is a first network slice in the at least one network slice, and the first network slice is a newly established network slice, a network slice on which a drive test is being performed, or a network slice for which no SLA is signed, step 101 is performed.

Optionally, before step 110, the method provided in this embodiment of this application may further include: The first network element receives a notification message from a third network element, where the notification message includes third indication information.

The third indication information is used to indicate that the first network slice is a newly established network slice, a network slice on which a drive test is being performed, or a network slice for which no SLA is signed. In this way, the first network element determines, based on the third indication information, that the first network slice is a newly established network slice, a network slice on which a drive test is being performed, or a network slice for which no SLA is signed.

It should be understood that, when the third network element is the network management network element, if the third network element establishes the first network slice, the third network element sends the notification message to the first network element. In addition, in addition to the third indication information, the notification message may further include at least one of the following information: identification information of the first network slice, a network area of the first network slice, and a maximum quantity of users allowed by the network management network element to access the first network slice.

Figure 10:
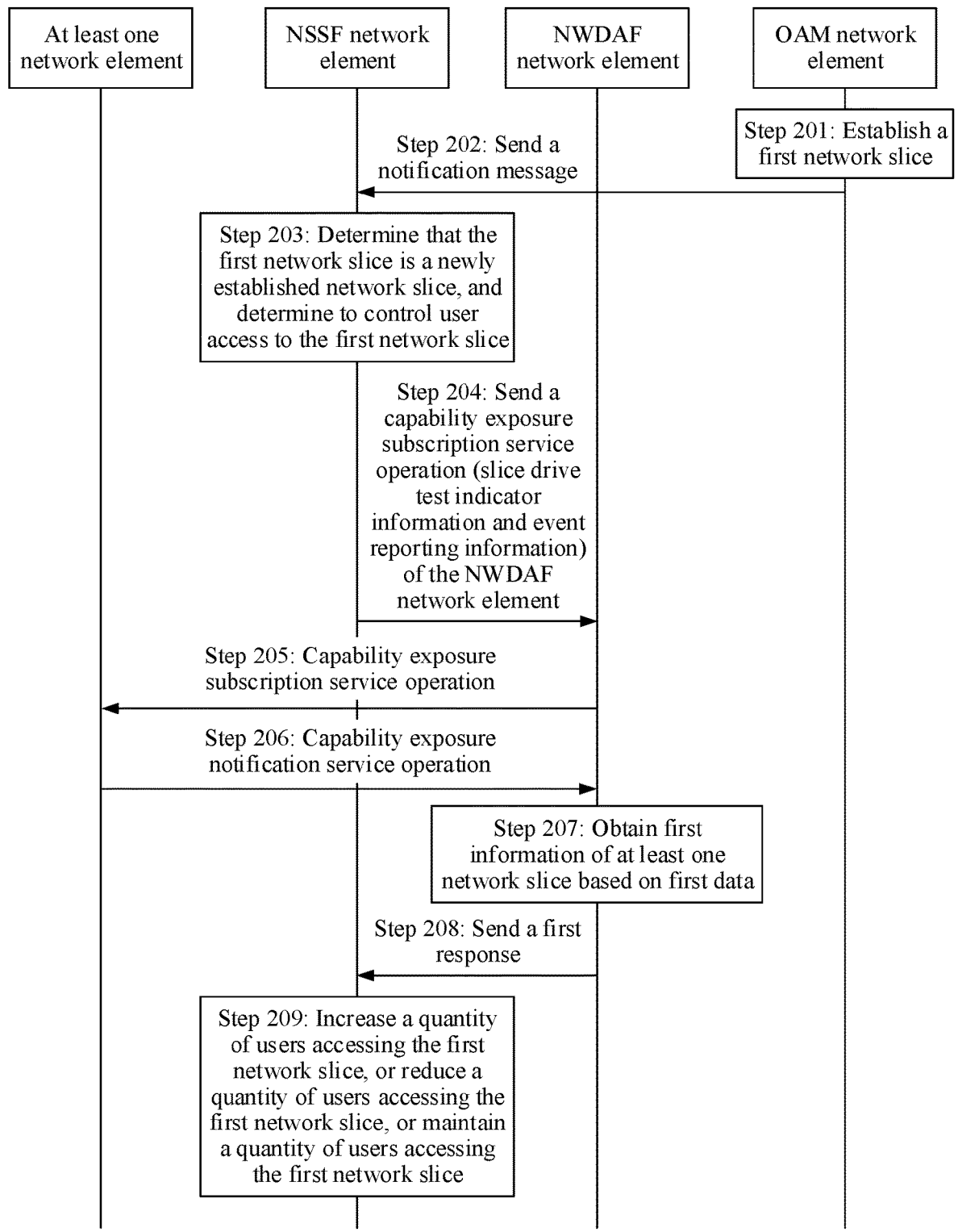
FIG. 10 to FIG. 12 are schematic diagrams of a specific embodiment according to an embodiment of this application.

For example, an example in which the communications system shown in FIG. 1 is used in the 5G network shown in FIG. 2 or FIG. 3 is used. An example in which the first network element is an NSSF network element, the second network element is an NWDAF network element, and the third network element is an OAM network element is used. An example in which the at least one network element includes a PCF network element, an SMF network element, an AF network element, and an OAM network element is used. FIG. 10 shows a specific implementation of a user access control method and an information sending method according to an embodiment of this application. The method includes the following steps.

Step 201: An OAM network element establishes a first network slice.

It should be understood that the OAM network element establishes the first network slice in a first network area, and when the OAM network element establishes the first network slice in the first network area, the first network area further has another network slice.

After establishing the first network slice, the OAM network element starts to allow a user to access the first network slice.

Step 202: The OAM network element sends a notification message to an NSSF network element.

The notification message may include at least one of the following information about the first network slice: identification information, third indication information, a network area, and a maximum quantity of users allowed by the OAM network element to access the first network slice.

Step 203: The NSSF network element determines, based on the third indication information in the notification message, that the first network slice is a newly established network slice, and determines to control user access to the first network slice.

Specifically, the NSSF network element may gradually increase users accessing the first network slice based on the maximum quantity of users allowed by the OAM network element to access the first network slice. For example, if the OAM network element allows one million users, the NSSF network element may first add one hundred thousand users to the first network slice.

Step 204: The NSSF network element sends a capability exposure subscription service operation (Nnwdaf_EventsSubscription_Subscribe) of the NWDAF network element to the NWDAF network element, so that the NWDAF network element receives the Nnwdaf_EventsSubscription_Subscribe.

The Nnwdaf_EventsSubscription_Subscribe in step 204 is the first request in the foregoing embodiment.

The Nnwdaf_EventsSubscription_Subscribe carries a slice drive test indicator and event reporting information.

It should be understood that the slice drive test indicator is the second indication information in the foregoing embodiment. The event reporting information is the first indication information in the foregoing embodiment. It may be understood that the event reporting information is an immediate reporting flag.

Step 205: The NWDAF network element sends a capability exposure subscription service operation (Nnf_EventExposure_Subscribe) to the at least one network element, so that any network element in the at least one network element receives the Nnf_EventExposure_Subscribe.

The Nnf_EventExposure_Subscribe carries at least one of the following information about the at least one network slice: identification information, a network area, time information, and fifth indication information.

It should be understood that the Nnf_EventExposure_Subscribe in step 205 is the fourth request in the foregoing embodiment.

It should be understood that in step 205, the NWDAF network element determines, based on the second indication information, that the at least one network element needs to send the Nnf_EventExposure_Subscribe.

Step 206: The at least one network element sends a capability exposure notification service operation (Nnf_EventExposure_Notify) to the NWDAF network element, so that the NWDAF network element receives the Nnf_EventExposure_Notify.

The Nnf_EventExposure_Notify is the fourth response in the foregoing embodiment, and the Nnf_EventExposure_Notify carries first data.

Step 207: The NWDAF network element obtains first information of the at least one network slice based on the first data.

For a specific process, refer to the description in the foregoing embodiment, and details are not described herein again.

Step 208: The NWDAF network element sends a first response to the NSSF network element, where the first response carries the first information.

Step 209: Based on the first information, if the NSSF network element determines that quality of the first network slice is higher than a quality requirement of the first network slice, the first network element increases a quantity of users accessing the first network slice, or if the NSSF network element determines that quality of the first network slice is lower than a quality requirement of the first network slice, the first network element reduces a quantity of users accessing the first network slice, or if the NSSF network element determines that quality of the first network slice is equal to a quality requirement of the first network slice, the first network element maintains a quantity of users accessing the first network slice.

Figure 11:
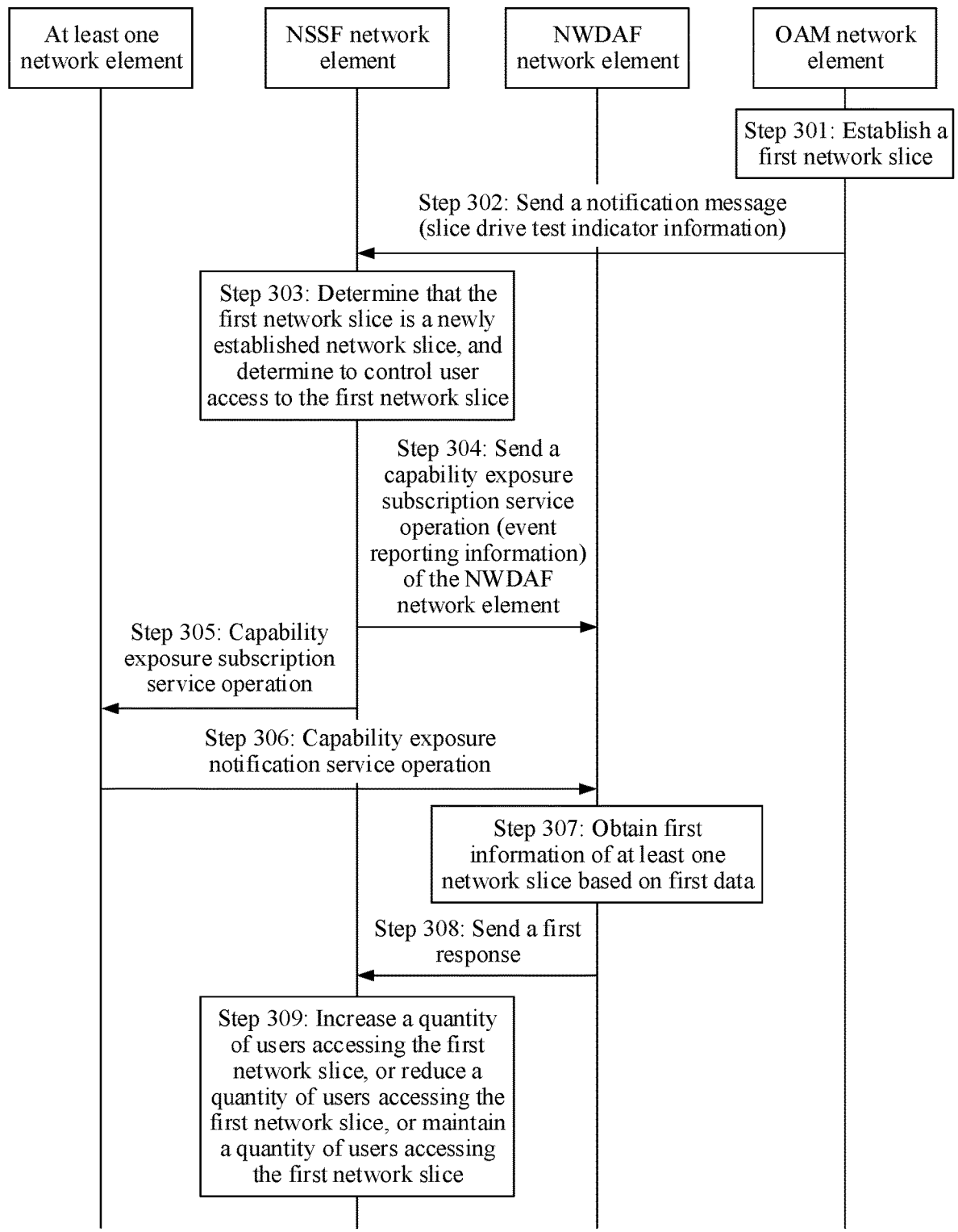

FIG. 11 provides a specific implementation of another user access control method and information sending method. The method includes the following steps.

Step 301 to step 303 are the same as step 201 to step 203 in FIG. 10. For details, refer to the descriptions in step 201 to step 203. Details are not described herein again.

A difference between step 304 and step 204 lies in that, in FIG. 11, the Nnwdaf_EventsSubscription_Subscribe carries the Event Reporting Information.

Step 305: The NSSF network element sends a capability exposure subscription service operation (Nnf_EventExposure_Subscribe) to the at least one network element, so that each network element in the at least one network element can receive the Nnf_EventExposure_Subscribe.

The Nnf_EventExposure_Subscribe herein is the second request in the foregoing embodiment. The Nnf_EventExposure_Subscribe carries fourth indication information.

It should be understood that if the at least one network element includes a PCF network element, the Nnf_EventExposure_Subscribe is Npcf_PolicyAuthorization_Subscribe. If the at least one network element includes an AMF network element or an SMF network element, Nnf_EventExposure_Subscribe is Nnf_EventExposure_Subscribe.

Step 306 to step 309 are the same as step 206 to step 209 in FIG. 10. For details, refer to the descriptions in step 206 to step 209. Details are not described herein again.

Figure 12:
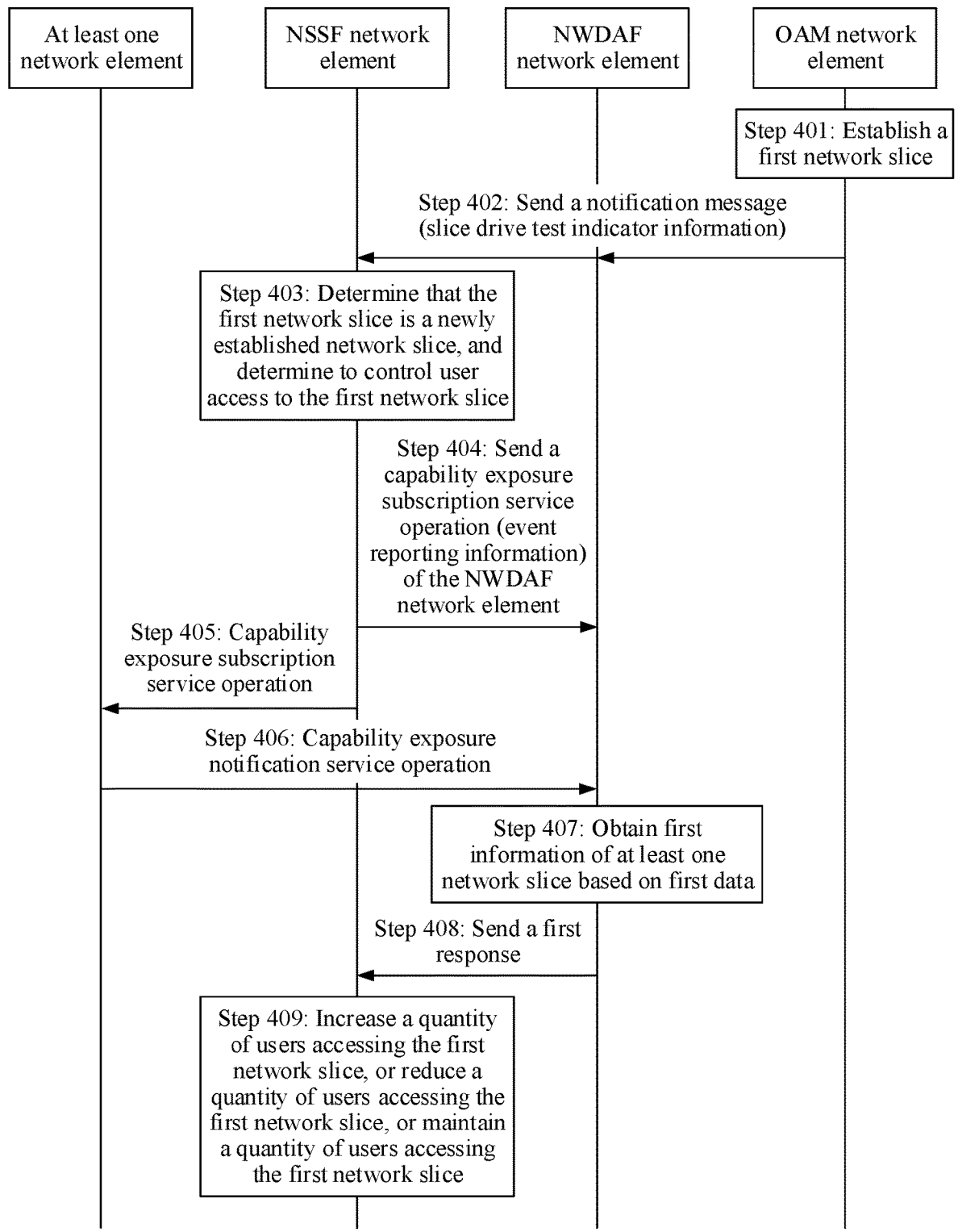

FIG. 12 shows a specific implementation of still another user access control method and information sending method. The method includes the following steps.

Step 401, step 403, and step 404 are the same as step 301, step 303, and step 304 in FIG. 11. For details, refer to the descriptions in step 301, step 303, and step 304. Details are not described herein again.

In addition, a difference between step 402 and step 302 lies in that, in step 402, the OAM network element sends a notification message to the NSSF network element and the NWDAF network element.

Step 405 to step 409 are the same as step 201 to step 209 in FIG. 10. For details, refer to the descriptions in step 201 to step 209. Details are not described herein again.

It should be understood that, in the embodiment shown in FIG. 12, the NWDAF network element determines to perform step 405 based on the third indication information from the OAM network element, to subscribe to flow-level service data and network data from the at least one network element.

The foregoing mainly describes the solutions in the embodiments of this application from a perspective of interaction between the network elements. It may be understood that, to implement the foregoing functions, each network element, such as a user access control apparatus (for example, the first network element) and an information sending apparatus (for example, the second network element), includes a corresponding hardware structure and/or software module for performing each function. A person skilled in the art should be easily aware that, in combination with units and algorithm steps in the examples described in the embodiments disclosed in this specification, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, function unit division may be performed on the user access control apparatus and the information sending apparatus based on the foregoing method examples. For example, each function unit may be obtained through division based on a corresponding function, or two or more functions may be integrated into one unit. The integrated unit may be implemented in a form of hardware, or may be implemented in a form of a software function unit. It should be noted that, in the embodiments of this application, division into units is an example, and is merely logical function division. During actual implementation, another division manner may be used.

An example in which function modules are obtained through division based on functions is used below for description.

Figure 13:
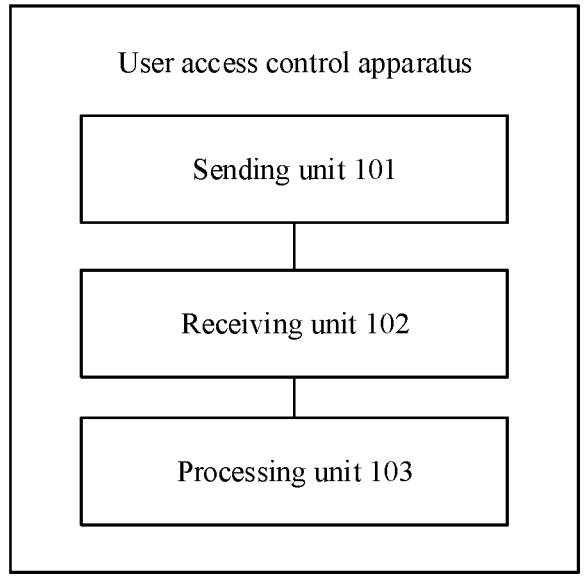
FIG. 13 is a first schematic structural diagram of a user access control apparatus according to an embodiment of this application.

When an integrated unit is used, FIG. 13 is a possible schematic structural diagram of a user access control apparatus in the foregoing embodiments. The user access control apparatus may be a first network element, or may be a chip used in a first network element. The user access control apparatus includes a sending unit 101, a receiving unit 102, and a processing unit 103.

The sending unit 101 is configured to support the user access control apparatus in performing step 101 in the foregoing embodiment.

The receiving unit 102 is configured to support the user access control apparatus in performing step 105 in the foregoing embodiment.

The processing unit 103 is configured to support the user access control apparatus in performing step 106 in the foregoing embodiment.

Optionally, the sending unit 101 is further configured to support the user access control apparatus in performing step 107 in the foregoing embodiment.

Optionally, the processing unit 103 is further configured to support the user access control apparatus in performing step 109 and step 110 in the foregoing embodiment.

Figure 14:
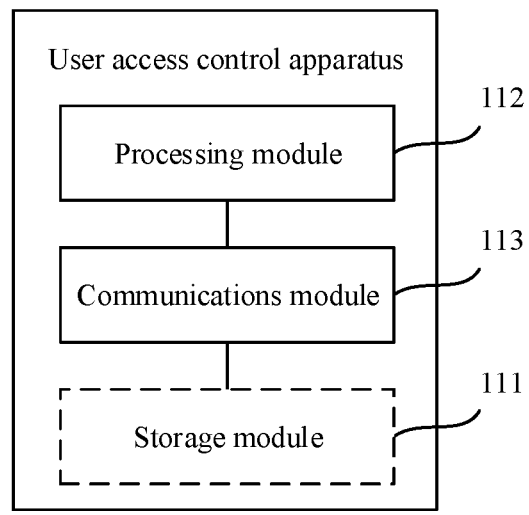
FIG. 14 is a second schematic structural diagram of a user access control apparatus according to an embodiment of this application.

When an integrated unit is used, FIG. 14 is a possible schematic diagram of a logical structure of the user access control apparatus in the foregoing embodiments. The user access control apparatus may be a first network element or a chip used in a first network element. The user access control apparatus includes a processing module 112 and a communications module 113. The processing module 112 is configured to control and manage an action of the user access control apparatus. For example, the processing module 112 is configured to perform a step of processing information/data in the user access control apparatus. The communications module 113 is configured to support the user access control apparatus in performing a step of sending or receiving information/data.

Optionally, the user access control apparatus may further include a storage module 111, configured to store program code and data of the user access control apparatus.

For example, the communications module 113 is configured to support the user access control apparatus in performing step 101 and step 105 in the foregoing embodiment. The processing module 112 is configured to support the user access control apparatus in performing step 106 in the foregoing embodiment.

Optionally, the processing module 112 is further configured to support the user access control apparatus in performing step 109 and step 110 in the foregoing embodiment.

Optionally, the communications module 113 is further configured to support the user access control apparatus in performing step 107 in the foregoing embodiment.

The processing module 112 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in the present disclosure. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

When the processing module 112 is a processor 41 or a processor 45, the communications module 113 is a communications interface 43 or a transceiver, and the storage module 111 is a memory 42, the user access control apparatus in this application may be the device shown in FIG. 4.

The memory 42, the processor 41 or the processor 45, and the communications interface 43 are connected to each other by using a communications line 44. For example, when the device shown in FIG. 4 is a user access control apparatus, the communications interface 43 is configured to support the user access control apparatus in performing step 101 and step 105 in the foregoing embodiment. The processor 41 or the processor 45 is configured to support the user access control apparatus in performing step 106 in the foregoing embodiment. Optionally, the processor 41 or the processor 45 is further configured to support the user access control apparatus in performing step 109 and step 110 in the foregoing embodiment.

Optionally, the communications interface 43 is further configured to support the user access control apparatus in performing step 107 in the foregoing embodiment.

Figure 15:
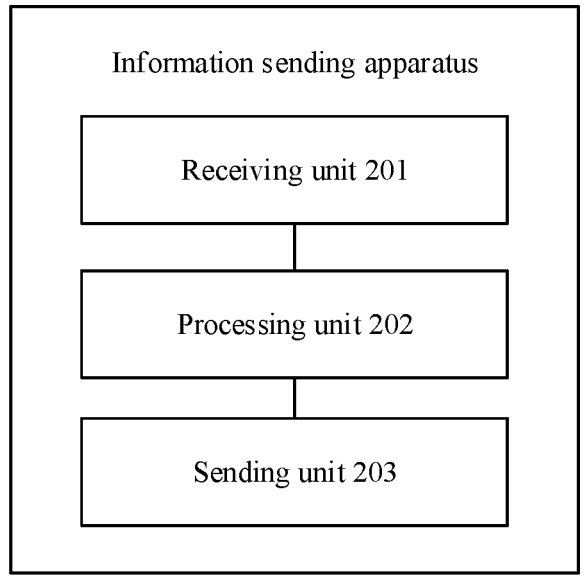
FIG. 15 is a first schematic structural diagram of an information sending apparatus according to an embodiment of this application.

When an integrated unit is used, FIG. 15 is a possible schematic structural diagram of an information sending apparatus in the foregoing embodiments. The information sending apparatus may be a second network element, or may be a chip used in a second network element. The information sending apparatus includes a receiving unit 201, a processing unit 202, and a sending unit 203.

The receiving unit 201 is configured to support the information sending apparatus in performing step 102 in the foregoing embodiment. The processing unit 202 is configured to support the information sending apparatus in performing step 103 in the foregoing embodiment. The sending unit 203 is configured to support the information sending apparatus in performing step 104 in the foregoing embodiment.

Optionally, the processing unit 202 is configured to support the information sending apparatus in performing step 1031 and step 1032 in the foregoing embodiment.

The sending unit 203 is further configured to support the information sending apparatus in performing step 1030 in the foregoing embodiment.

Figure 16:
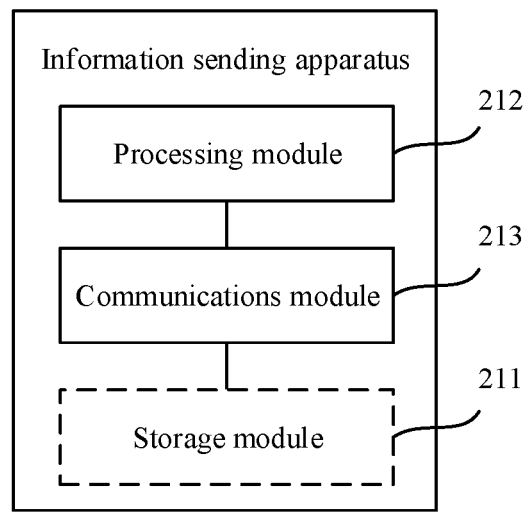
FIG. 16 is a second schematic structural diagram of an information sending apparatus according to an embodiment of this application.

When an integrated unit is used, FIG. 16 is a schematic diagram of a possible logical structure of an information sending apparatus included in the foregoing embodiments. The information sending apparatus may be a second network element, or may be a chip used in a second network element. The information sending apparatus includes a processing module 212 and a communications module 213. The processing module 212 is configured to control and manage an action of the information sending apparatus. For example, the processing module 212 is configured to perform a step of processing information/data in the information sending apparatus. The communications module 213 is configured to support the information sending apparatus in performing a step of sending or receiving information/data.

Optionally, the information sending apparatus may further include a storage module 211, configured to store program code and data of the information sending apparatus.

The communications module 213 is configured to support the information sending apparatus in performing step 102 and step 104 in the foregoing embodiment. The processing module 212 is configured to support the information sending apparatus in performing step 104 in the foregoing embodiment.

Optionally, the processing module 212 is further configured to support the information sending apparatus in performing step 1031 and step 1032 in the foregoing embodiment.

The communications module 213 is further configured to support the information sending apparatus in performing step 1030 in the foregoing embodiment.

The processing module 212 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits described with reference to content disclosed in the present disclosure. Alternatively, the processor may be a combination of processors implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

When the processing module 212 is a processor 41 or a processor 45, the communications module 213 is a communications interface 43 or a transceiver, and the storage module 211 is a memory 42, the information sending apparatus in this application may be the device shown in FIG. 4.

The memory 42, the processor 41 or the processor 45, and the communications interface 43 are connected to each other by using a communications line 44. For example, when the device shown in FIG. 4 is an information sending apparatus, the communications interface 43 is configured to support the information sending apparatus in performing step 102 and step 104 in the foregoing embodiment. The processor 41 or the processor 45 is configured to support the information sending apparatus in performing step 104 in the foregoing embodiment.

Optionally, the processor 41 or the processor 45 is further configured to support the information sending apparatus in performing step 1031 in the foregoing embodiment.

The communications interface 43 is further configured to support the information sending apparatus in performing step 1030 in the foregoing embodiment.

Figure 17:
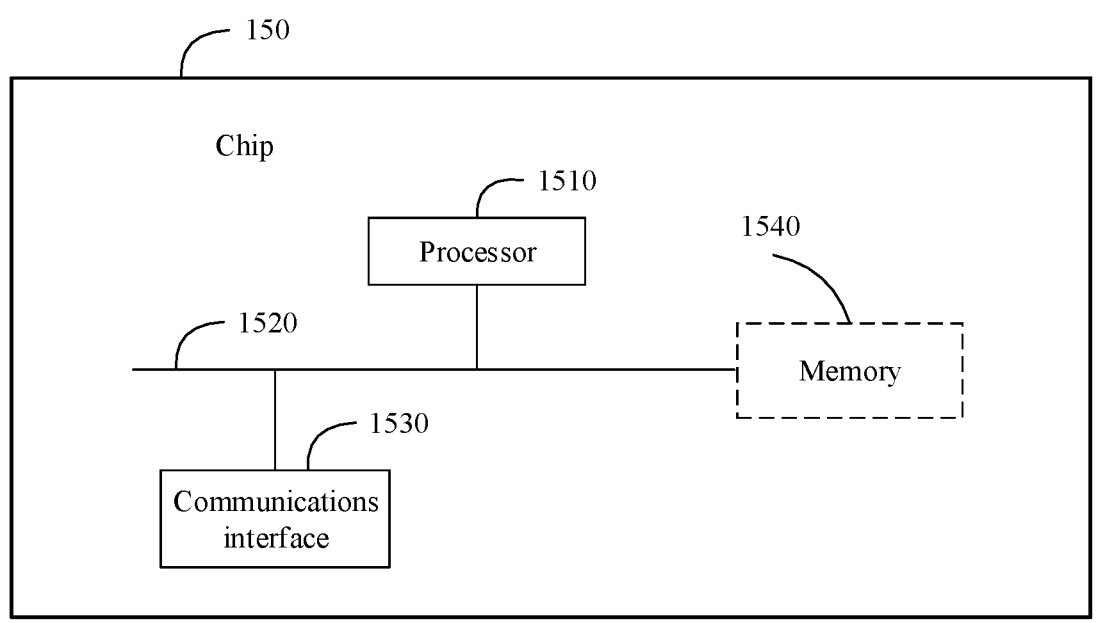
FIG. 17 is a schematic structural diagram of a chip according to an embodiment of this application.

FIG. 17 is a schematic structural diagram of a chip 150 according to an embodiment of the present disclosure. The chip 150 includes one or more (including two) processors 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, or a subset thereof, or an extension set thereof.

In this embodiment of the present disclosure, a corresponding operation is performed by invoking the operation instructions stored in the memory 1540 (where the operation instructions may be stored in an operating system).

In a possible implementation, structures of chips used in a user access control apparatus and an information sending apparatus are similar, and different apparatuses may use different chips to implement respective functions.

The processor 1510 controls operations of the user access control apparatus and the information sending apparatus. The processor 1510 may also be referred to as a central processing unit (CPU). The memory 1540 may include a read-only memory and a random access memory, and provide instructions and data for the processor 1510. A part of the memory 1540 may further include a non-volatile random access memory (NVRAM). For example, in an application, the memory 1540, the communications interface 1530, and the memory 1540 are coupled together by using a bus system 1520. The bus system 1520 may include a power bus, a control bus, a status signal bus, and the like in addition to a data bus. However, for clear description, various buses are marked as the bus system 1520 in FIG. 17.

The sending unit and the receiving unit may be an interface circuit or a communications interface of the apparatus, and are configured to receive a signal from another apparatus. For example, when the apparatus is implemented in a chip manner, the sending unit and the receiving unit are interface circuits or communications interfaces used by the chip to receive a signal or send a signal from another chip or the another apparatus.

The method disclosed in the foregoing embodiments of the present disclosure may be applied to the processor 1510, or implemented by the processor 1510. The processor 1510 may be an integrated circuit chip and has a signal processing capability. In an implementation process, the steps in the foregoing method may be implemented by using a hardware integrated logical circuit in the processor 1510 or by using instructions in a form of software. The processor 1510 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1510 may implement or perform the methods, steps, and logical block diagrams that are disclosed in the embodiments of the present disclosure. The general-purpose processor may be a microprocessor, or the processor may be any conventional processor or the like. The steps of the methods disclosed with reference to the embodiments of the present disclosure may be directly performed by a hardware decoding processor, or may be performed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communications interface 1530 is configured to perform receiving and sending steps of the first network element and the second network element in the embodiments shown in FIG. 5 to FIG. 9. The processor 1510 is configured to perform processing steps of the first network element and the second network element in the embodiments shown in FIG. 5 to FIG. 9.

In the foregoing embodiment, the instructions that are stored in the memory and that are to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

According to one aspect, a computer-readable storage medium is provided. The computer-readable storage medium stores instructions. When the instructions are run, a first network element or a chip used in a first network element is enabled to perform step 101, step 105, step 106, step 107, step 109, and step 110 in the embodiments.

According to another aspect, a computer-readable storage medium is provided. The computer-readable storage medium stores instructions, and when the instructions are run, a second network element or a chip used in a second network element is enabled to perform step 102, step 103, step 1030, step 1031, step 1032, and step 104 in the embodiments.

The foregoing readable storage medium may include: any medium that can store program code, such as a USB flash drive, a removable hard disk, a read-only memory, a random access memory, a magnetic disk, or an optical disc.

According to one aspect, a computer program product including instructions is provided, where the computer program product stores the instructions. When the instructions are run, a first network element or a chip used in a first network element is enabled to perform step 101, step 105, step 106, step 107, step 109, and step 110 in the embodiments.

According to another aspect, a computer program product including instructions is provided, where the computer program product stores the instructions. When the instructions are run, a second network element or a chip used in a second network element is enabled to perform step 102, step 103, step 1030, step 1031, step 1032, and step 104 in the embodiments.

According to one aspect, a chip is provided, where the chip is used in a first network element. The chip includes at least one processor and a communications interface. The communications interface is coupled to the at least one processor. The processor is configured to run instructions, to perform step 101, step 105, step 106, step 107, step 109, and step 110 in the embodiments.

According to another aspect, a chip is provided, where the chip is used in a second network element. The chip includes at least one processor and a communications interface. The communications interface is coupled to the at least one processor. The processor is configured to run instructions, to perform step 102, step 103, step 1030, step 1031, step 1032, and step 104 in the embodiments.

An embodiment of this application provides a communications system. The system includes: the user access control apparatus described in either of FIG. 13 and FIG. 14, and the information sending apparatus described in either of FIG. 15 and FIG. 16.

It should be understood that, for specific steps performed by the user access control apparatus and the information sending apparatus in the communications system, refer to the descriptions in the foregoing embodiments, and details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, that can be integrated by using one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clearly that various modifications and combinations may be made to them without departing from the scope of this application. Correspondingly, the specification and the accompanying drawings are merely examples for description of this application defined by the appended claims, and are considered as any or all of modifications, variations, combinations, or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A user access control method, comprising:
sending, by a first network element, a first request to a second network element, wherein the first request comprises at least one of first indication information and second indication information, wherein the first indication information indicates to report first information of at least one network slice to the first network element, and the second indication information indicates that a first network slice is a newly established network slice, a network slice on which a drive test is being performed, or a network slice for which no service level agreement (SLA) is signed;
determining, by the second network element, the first information of the at least one network slice, wherein the first information of the at least one network slice is for determining a relationship between quality and a quality requirement of the at least one network slice;
sending, by the second network element, a first response to the first network element, wherein the first response comprises the first information of the at least one network slice;
controlling, by the first network element, user access to the first network slice based on a relationship between a quality and a quality requirement of the at least one network slice indicated by the first information of the at least one network slice; and
sending, by the first network element, a second request to at least one network element corresponding to the at least one network slice, wherein the second request comprises fourth indication information, wherein the fourth indication information indicates to report first data that is on the at least one network element and that is corresponding to the at least one network slice to the second network element.

2. The method according to claim 1, wherein the at least one network slice comprises the first network slice.

3. The method according to claim 2, wherein the controlling, by the first network element, user access to the first network slice based on the relationship between the quality and the quality requirement of the at least one network slice comprises:
determining, by the first network element, that a quality of the first network slice is higher than a quality requirement of the first network slice, and increasing, by the first network element, a quantity of users accessing the first network slice; or determining, by the first network element, that the quality of the first network slice is lower than the quality requirement of the first network slice, and reducing, by the first network element, the quantity of users accessing the first network slice; or determining, by the first network element, that the quality of the first network slice is equal to the quality requirement of the first network slice, and maintaining, by the first network element, the quantity of users accessing the first network slice.

4. The method according to claim 1, wherein the method further comprises:

determining, by the first network element, that the first network slice is a newly established network slice, a network slice on which a drive test is being performed, or a network slice for which no SLA is signed.

5. The method according to claim 4, wherein the determining, by the first network element, that the first network slice is the newly established network slice, the network slice on which the drive test is being performed, or the network slice for which no SLA is signed comprises:

receiving, by the first network element, a notification message from a third network element, wherein the notification message comprises third indication information, and the third indication information indicates that the first network slice is the newly established network slice, the network slice on which the drive test is being performed, or the network slice for which no SLA is signed; and determining, by the first network element based on the third indication information, that the first network slice is the newly established network slice, the network slice on which the drive test is being performed, or the network slice for which no SLA is signed.

6. The method according to claim 1, wherein the method further comprises:

determining, by the first network element, the fourth indication information based on the second indication information.

7. The method according to claim 1, wherein the method further comprises:

sending, by the first network element, a third request to a fourth network element to request address information of the at least one network element, wherein the third request comprises at least one of the following information corresponding to the at least one network slice: identification information, a network area, and time information of the network slice; and receiving, by the first network element, the address information of the at least one network element from the fourth network element.

8. The method according to claim 1, wherein the first network element is any one of a network slice selection function (NSSF) network element, a network slice management function (NSMF) network element, or a network slice subnet management function (NSSMF) network element; and the second network element is a network data analytics function (NWDAF) network element or a management data analytics function (MDAF) network element.

9. An apparatus, comprising:

a memory, configured to store computer instructions; and at least one processor, configured to execute the computer instructions to cause the apparatus to:

send a first request to a second network element, wherein the first request comprises at least one of first indication information and second indication information, wherein the first indication information indicates to report first information of at least one network slice to the apparatus, and the second indication information indicates that a first network slice is a newly established network slice, a network slice on which a drive test is being performed, or a network slice for which no service level agreement (SLA) is signed;

receive a first response from the second network element, wherein the first response comprises the first information of the at least one network slice, and the first information of the at least one network slice is for determining a relationship between a quality and a quality requirement of the at least one network slice;

control user access to the first network slice based on the relationship between the quality and the quality requirement of the at least one network slice; and send a second request to at least one network element corresponding to the at least one network slice, wherein the second request comprises fourth indication information, wherein the fourth indication information indicates to report first data that is on the at least one network element and that is corresponding to the at least one network slice to the second network element.

10. The apparatus according to claim 9, wherein the at least one network slice comprises the first network slice.

11. The apparatus according to claim 9, wherein the at least one processor is configured to execute the computer instructions to cause the apparatus to:

determine that a quality of the first network slice is higher than a quality requirement of the first network slice, and increase a quantity of users accessing the first network slice; or determine that the quality of the first network slice is lower than the quality requirement of the first network slice, and reduce the quantity of users accessing the first network slice; or determine that the quality of the first network slice is equal to the quality requirement of the first network slice, and maintain the quantity of users accessing the first network slice.

12. The apparatus according to claim 9, wherein the at least one processor is further configured to execute the computer instructions to cause the apparatus to:

determine that the first network slice is the newly established network slice, the network slice on which the drive test is being performed, or the network slice for which no SLA is signed.

13. The apparatus according to claim 12, wherein the at least one processor is configured to execute the computer instructions to cause the apparatus to:

receive a notification message from a third network element, wherein the notification message comprises third indication information, and the third indication information indicates that the first network slice is the newly established network slice, the network slice on which the drive test is being performed, or the network slice for which no SLA is signed; and determine, based on the third indication information, that the first network slice is the newly established network slice, the network slice on which the drive test is being performed, or the network slice for which no SLA is signed.

14. The apparatus according to claim 9, wherein the at least one processor is configured to execute the computer instructions to cause the apparatus to:

determine the fourth indication information based on the second indication information.

15. The apparatus according to claim 9, wherein the at least one processor is configured to execute the computer instructions to cause the apparatus to:
- send a third request to a fourth network element to request address information of the at least one network element, wherein the third request comprises at least one of the following information corresponding to the at least one network slice: identification information, a network area, and time information of the network slice; and
- receive the address information of the at least one network element from the fourth network element.

16. The apparatus according to claim 9, wherein the apparatus is any one of a network slice selection function (NSSF) network element, a network slice management function (NSMF) network element, or a network slice subnet management function (NSSMF) network element; and the second network element is a network data analytics function (NWDAF) network element or a management data analytics function (MDAF) network element.

17. A non-transitory computer readable storage medium, configured to store a computer program, wherein the computer program comprises instructions, when the instruction runs on a processor, an apparatus comprising the processor is caused to:
- send a first request to a second network element, wherein the first request comprises at least one of first indication information and second indication information, wherein the first indication information indicates to report first information of at least one network slice to the apparatus, and the second indication information indicates that a first network slice is a newly established network slice, a network slice on which a drive test is being performed, or a network slice for which no service level agreement (SLA) is signed;
- receive a first response from the second network element, wherein the first response comprises the first information of the at least one network slice, and the first information of the at least one network slice is for determining a relationship between a quality and a quality requirement of the at least one network slice;
- control user access to the first network slice based on the relationship between the quality and the quality requirement of the at least one network slice; and
- send a second request to at least one network element corresponding to the at least one network slice, wherein the second request comprises fourth indication information, wherein the fourth indication information indicates to report first data that is on the at least one network element and that is corresponding to the at least one network slice to the second network element.

18. The non-transitory computer readable storage medium according to claim 17, wherein when the instruction runs on a processor, an apparatus comprising the processor is further caused to: determine that the first network slice is the newly established network slice, the network slice on which the drive test is being performed, or the network slice for which no SLA is signed.

* * * * *

UNITED STATES PATENT AND TRADEMARK OFFICE
CERTIFICATE OF CORRECTION

PATENT NO. : 11,877,227 B2
APPLICATION NO. : 17/331063
DATED : January 16, 2024
INVENTOR(S) : Xin et al.

It is certified that error appears in the above-identified patent and that said Letters Patent is hereby corrected as shown below:

In the Claims

Claim 16: Column 55, Line 15: "(NS SF) network element, a network slice management" should read -- (NSSF) network element, a network slice management --.

Signed and Sealed this
Thirtieth Day of April, 2024

Katherine Kelly Vidal
*Director of the United States Patent and Trademark Office*